United States Patent
Kawai et al.

(10) Patent No.: US 10,830,279 B2
(45) Date of Patent: Nov. 10, 2020

(54) TAPERED ROLLER BEARING

(71) Applicant: NTN CORPORATION, Osaka (JP)

(72) Inventors: Takashi Kawai, Iwata (JP); Tomoki Matsushita, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/497,763

(22) PCT Filed: Mar. 26, 2018

(86) PCT No.: PCT/JP2018/012126
§ 371 (c)(1),
(2) Date: Sep. 25, 2019

(87) PCT Pub. No.: WO2018/181174
PCT Pub. Date: Oct. 4, 2018

(65) Prior Publication Data
US 2020/0025251 A1    Jan. 23, 2020

(30) Foreign Application Priority Data

Mar. 28, 2017  (JP) ................................. 2017-063369
Mar. 28, 2017  (JP) ................................. 2017-063970

(51) Int. Cl.
*F16C 33/36*  (2006.01)
*F16C 19/36*  (2006.01)
(Continued)

(52) U.S. Cl.
CPC .............. *F16C 33/36* (2013.01); *F16C 19/36* (2013.01); *F16C 33/46* (2013.01); *F16C 33/58* (2013.01)

(58) Field of Classification Search
CPC .... F16C 19/364; F16C 19/383; F16C 19/385; F16C 19/386; F16C 19/388; F16C 33/36;
(Continued)

(56) References Cited

U.S. PATENT DOCUMENTS 2,631,904 A * 3/1953 Frenkel ................ F16C 19/364
                                                              384/450
6,086,261 A * 7/2000 Nakagawa .......... F16C 33/6688
                                                              384/571
(Continued)

FOREIGN PATENT DOCUMENTS

JP    2002-221223 A    8/2002
JP    2003-226918 A    8/2003
(Continued)

OTHER PUBLICATIONS

International Search Report issued in corresponding International Patent Application No. PCT/JP2018/012126, dated Jun. 5, 2018, with English translation.

*Primary Examiner* — Phillip A Johnson
(74) *Attorney, Agent, or Firm* — McDermott Will & Emery LLP

(57) ABSTRACT

In a tapered roller bearing, a cage includes a plurality of trapezoidal pockets and the pockets accommodate and hold a plurality of rollers. A notch having a width is provided in a post on a smaller width side of the pocket of the cage from a boundary between a smaller annular portion and a post toward a larger annular portion. Lubricating oil which flows from an inner diameter side of the cage toward an inner ring is quickly discharged through the notch toward an outer ring on an outer diameter side. A distance from an outermost surface of at least any one of the outer ring and the inner ring of the roller and a plurality of rollers to a bottom of a nitrogen enriched layer is equal to or longer than 0.2 mm. A rolling surface of the roller is provided with a logarithmic crowning profile.

15 Claims, 23 Drawing Sheets

(51) Int. Cl.
*F16C 33/46* (2006.01)
*F16C 33/58* (2006.01)

(58) Field of Classification Search
CPC .............. F16C 33/4623; F16C 33/4629; F16C 33/4635; F16C 33/4676; F16C 33/585; F16C 33/6681
See application file for complete search history.

(56) References Cited

U.S. PATENT DOCUMENTS

| | | | |
|---|---|---|---|
| 6,709,164 B2 * | 3/2004 | Takemura | F16C 19/364 384/450 |
| 8,308,373 B2 * | 11/2012 | Miyachi | F16C 33/526 384/574 |
| 2002/0102041 A1 | 8/2002 | Matsuyama et al. | |
| 2003/0123769 A1 | 7/2003 | Ohki | |
| 2009/0324155 A1 | 12/2009 | Okamoto et al. | |
| 2010/0002975 A1 | 1/2010 | Ueno | |
| 2012/0033909 A1 | 2/2012 | Fujiwara | |
| 2015/0259764 A1 * | 9/2015 | Hidaka | C22C 38/00 384/492 |

FOREIGN PATENT DOCUMENTS

| | | | | |
|---|---|---|---|---|
| JP | 2006-112559 A | 4/2006 | | |
| JP | 2007-120548 A | 5/2007 | | |
| JP | 2008-38927 A | 2/2008 | | |
| JP | 2008-51276 A | 3/2008 | | |
| JP | 2009-197904 A | 9/2009 | | |
| JP | 2010-255730 A | 11/2010 | | |
| JP | 2013068281 A * | 4/2013 | .............. | F16C 33/56 |
| WO | 2010/122955 A1 | 10/2010 | | |

* cited by examiner

TAPERED ROLLER BEARING

CROSS-REFERENCE OF RELATED APPLICATIONS

This application is the U.S. National Phase under 35 U.S.C. § 371 of International Patent Application No. PCT/JP2018/012126, filed on Mar. 26, 2018, which in turn claims the benefit of Japanese Application No. 2017-063369, filed on Mar. 28, 2017, and Japanese Application No. 2017-063970, filed on Mar. 28, 2017, the entire disclosures of which Applications are incorporated by reference herein.

TECHNICAL FIELD

The present invention relates to a tapered roller bearing.

BACKGROUND ART

With efforts for enhancing fuel economy in recent years, bearings have increasingly been reduced in size in a transmission and a differential gear for automobiles. Accordingly, a space permitted for a bearing is made smaller and a small bearing should bear a high load. Furthermore, as a housing made of aluminum is adopted, rigidity of a case included in a bearing has lowered and inclination of a shaft has become greater. Therefore, the bearing is required to have durability even in an environment where misalignment is noticeable. With the backgrounds above, tapered roller bearings capable of bearing a high load including misalignment in spite of their small sizes have increasingly been used.

As an approach to such enhancement in fuel economy, it has been proposed to obtain a contour line of a crowning profile expressed by a logarithmic function in a bearing component disclosed, for example, in Japanese Patent Laying-Open No. 2009-197904 (PTL 1). Furthermore, for example, Japanese Patent Laying-Open No. 2003-226918 (PTL 2) discloses a bearing component including a nitride layer made finer by special heat treatment called fine austenite strengthening (FA treatment) for achieving a longer lifetime.

CITATION LIST

Patent Literature

PTL 1: Japanese Patent Laying-Open No. 2009-197904
PTL 2: Japanese Patent Laying-Open No. 2003-226918

SUMMARY OF INVENTION

Technical Problem

Since a construction including both of the contour line of the crowning profile expressed by the logarithmic function and the nitride layer made finer by FA treatment has not yet been proposed, contribution to enhanced fuel economy of automobiles has not been sufficient.

A tapered roller bearing has been known to suffer from greater torque loss due to increase in lubricating oil that flows from an inner diameter side of the cage toward the inner ring. Therefore, further enhanced fuel economy and reduction in torque loss should be achieved by constructing the tapered roller bearing such that lubricating oil that flows from the inner diameter side of the cage toward the inner ring is quickly discharged through a notch toward the outer ring on an outer diameter side.

An object of the present invention is to provide a tapered roller bearing capable of achieving reduction in torque loss during use and achieving a longer lifetime and improved durability.

Solution to Problem

A tapered roller bearing according to the present invention includes an outer ring, an inner ring, a plurality of tapered rollers, and a cage. The outer ring includes an outer-ring raceway surface around an inner circumferential surface thereof. The inner ring includes an inner-ring raceway surface around an outer circumferential surface thereof and is arranged on a radially inner side relative to the outer ring. The plurality of tapered rollers are disposed between the outer-ring raceway surface and the inner-ring raceway surface and the tapered roller includes a rolling surface in contact with the outer-ring raceway surface and the inner-ring raceway surface. The cage includes a plurality of pockets arranged at prescribed intervals in a circumferential direction and accommodates and holds the plurality of tapered rollers in the plurality of pockets. The cage includes a smaller annular portion continuous on a smaller-diameter end face side of the tapered roller, a larger annular portion continuous on a larger-diameter end face side of the tapered roller, and a plurality of posts that couple the annular portions to each other. The pocket is provided in such a trapezoidal shape that a portion accommodating a smaller diameter side of the tapered roller is located on a smaller width side and a portion accommodating a larger diameter side is located on a larger width side. By providing a notch having a width in the post on the smaller width side of the pocket of the cage from a boundary between the smaller annular portion and the post toward the larger annular portion, lubricating oil that flows from an inner diameter side of the cage toward the inner ring is quickly discharged from the notch toward the outer ring on an outer diameter side, and an edge of the smaller annular portion on a side of the pocket is in such a shape that a base portion on the smaller width side of the pocket extends to the post. At least any one of the outer ring, the inner ring, and the plurality of tapered rollers includes a nitrogen enriched layer formed on a surface layer of the outer-ring raceway surface, the inner-ring raceway surface, or the rolling surface. A distance from an outermost surface of the surface layer to a bottom of the nitrogen enriched layer is not shorter than 0.2 mm. The rolling surface of the tapered roller is provided with a crowning profile. A sum of drops of the crowning profiles is expressed in a y-z coordinate system with a generatrix of the rolling surface of the tapered roller being defined as a y axis and a direction orthogonal to the generatrix being defined as a z axis, in an expression (1)

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

where $K_1$, $K_2$, and $z_m$ represent design parameters, Q represents a load, L represents a length in a direction of the generatrix, of an effective contact portion of the rolling surface in the tapered roller, E' represents an equivalent elastic modulus, a represents a length from an origin on the generatrix of the rolling surface of the tapered roller to an end of the effective contact portion, and A is defined as $A = 2K_1Q/\pi LE'$.

Advantageous Effects of Invention

According to the present invention, a tapered roller bearing capable of achieving reduced torque loss during use by allowing lubricating oil that flows from an inner diameter side of a cage toward an inner ring to quickly be discharged through a notch toward an outer ring on an outer diameter side can be provided. A tapered roller bearing capable of achieving a longer lifetime and improved durability can be provided.

DESCRIPTION OF EMBODIMENTS

First Embodiment

An embodiment of the present invention will be described below with reference to the drawings.

A tapered roller bearing in the present embodiment will be described stepwise below by mainly focusing on FIG. 1 and FIG. 10 which will be described later. Features of the tapered roller bearing in the present embodiment except for features that appear for the first time in FIG. 10 which will be described later will initially be described with reference to FIGS. 1 to 4.

Figure 1:
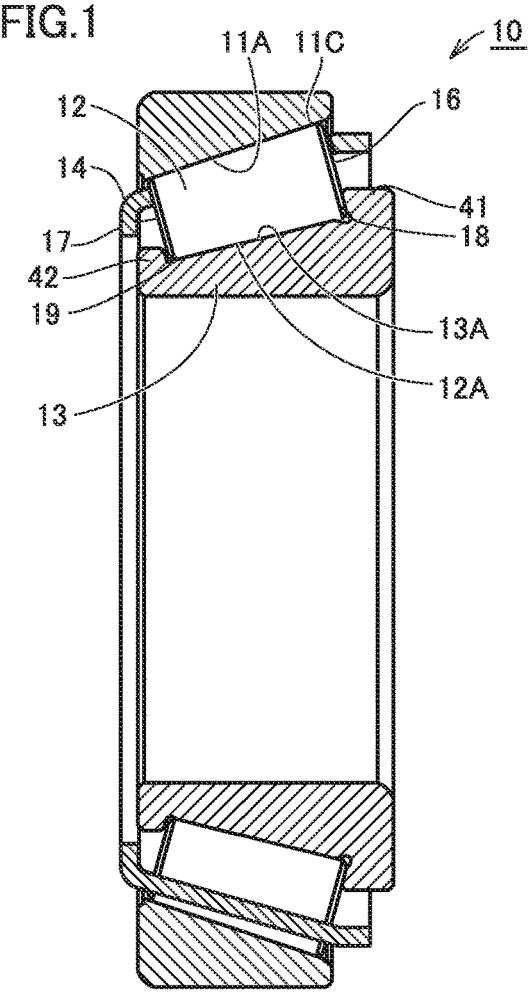
FIG. 1 is a schematic cross-sectional view roughly showing a construction of a tapered roller bearing according to the present embodiment.

A tapered roller bearing 10 shown in FIG. 1 mainly includes an outer ring 11, an inner ring 13, rollers 12 as a plurality of tapered rollers, and a cage 14. Outer ring 11 has an annular shape, and includes a raceway surface 11A as an outer-ring raceway surface 11A around its inner circumferential surface. Inner ring 13 has an annular shape, and includes a raceway surface 13A as an inner-ring raceway surface around its outer circumferential surface. Inner ring 13 is arranged on an inner diameter side of outer ring 11 such that raceway surface 13A faces raceway surface 11A. In the description below, a direction along the central axis of tapered roller bearing 10 is referred to as an "axial direction," a direction orthogonal to the central axis is referred to as a "radial direction," and a direction along a circular arc around the central axis is referred to as a "circumferential direction."

Rollers 12 are arranged on the inner circumferential surface of outer ring 11. Roller 12 has a rolling surface 12A as a roller rolling surface and comes in contact with raceway surface 13A and raceway surface 11A at rolling surface 12A. The plurality of rollers 12 are arranged at prescribed pitches in the circumferential direction in cage 14 made of a synthetic resin. Thus, roller 12 is held on the annular raceway of outer ring 11 and inner ring 13 in a rollable manner. Tapered roller bearing 10 is constructed such that the apex of a cone including raceway surface 11A, the apex of a cone including raceway surface 13A, and the apex of a cone including the locus of the rotation axis of roller 12 when the roller rolls meet at one point on the centerline of the bearing. According to such a construction, outer ring 11 and inner ring 13 of tapered roller bearing 10 are rotatable relative to each other. Cage 14 is not limited to a cage made of a resin and may be of a metal.

Outer ring 11, inner ring 13, and roller 12 may be formed of steel. Steel at least contains at least 0.6 mass % and at most 1.2 mass % of carbon, at least 0.15 mass % and at most 1.1 mass % of silicon, and at least 0.3 mass % and at most 1.5 mass % of manganese in a portion other than nitrogen enriched layers 11B, 12B, and 13B. Steel may further contain at most 2.0 mass % of chromium.

In the above construction, when a carbon content exceeds 1.2 mass %, cold workability is impaired by a high hardness of a material in spite of spheroidizing annealing, and a sufficient amount of cold working and sufficient working accuracy cannot be obtained in cold working. In addition, an over-carburized structure tends to be formed during carbonitriding treatment and cracking strength may be lowered. When the carbon content is lower than 0.6 mass %, it takes a long time to ensure a required surface hardness and a required amount of retained austenite, and it is difficult to obtain a required internal hardness in quenching after reheating.

The Si content of 0.15 to 1.1 mass % is set because Si can increase resistance against softening by tempering to ensure heat resistance and thus improve rolling fatigue life characteristics under lubrication with foreign matters being introduced. When the Si content is less than 0.15 mass %, the rolling fatigue life characteristics under lubrication with foreign matters being introduced are not improved. When the Si content exceeds 1.1 mass %, hardness after normalizing becomes too high to impair cold workability.

Mn is effective for ensuring hardenability of a carbonitrided layer and a core portion. When the Mn content is less than 0.3 mass %, sufficient hardenability cannot be obtained and sufficient strength cannot be ensured in the core portion. When the Mn content exceeds 1.5 mass %, hardenability becomes excessive and a hardness after normalizing becomes high and cold workability is impaired. Furthermore, austenite is excessively stabilized, which leads to an excessive amount of retained austenite in the core portion and acceleration of dimensional change over time. When steel contains at most 2.0 mass % of chromium, a carbide or a nitride of chromium is precipitated at a surface layer portion and a hardness of the surface layer portion can easily be enhanced. The Cr content of at most 2.0 mass % is set because the Cr content exceeding 2.0 mass % leads to significant lowering in cold workability and the content exceeding 2.0 mass % is less in effect of enhancement to a hardness of the surface layer portion.

Naturally, steel in the present disclosure may contain Fe as a main component and may contain an inevitable impurity in addition to the elements above. Examples of the inevitable impurity include phosphorus (P), sulfur (S), nitrogen (N), oxygen (O), aluminum (Al), and the like. An amount of these inevitable impurity elements is 0.1 mass % or less.

From a different point of view, outer ring 11 and inner ring 13 are preferably made of a steel material representing an exemplary bearing material such as JIS SUJ2. Roller 12 may be made of a steel material representing an exemplary bearing material such as JIS SUJ2. Alternatively, roller 12 may be made of another material such as a sialon sintered material.

Figure 2:
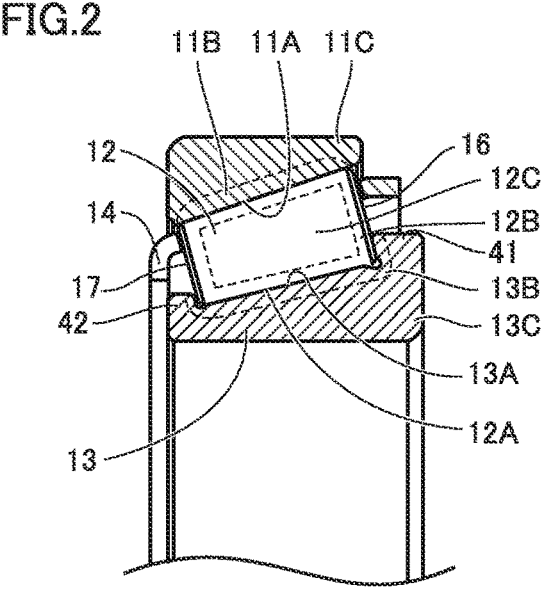
FIG. 2 is an enlarged cross-sectional view of a main portion of the tapered roller bearing shown in FIG. 1.

As shown in FIG. 2, nitrogen enriched layers 11B and 13B are formed in raceway surface 11A of outer ring 11 and raceway surface 13A of inner ring 13, respectively. In inner ring 13, nitrogen enriched layer 13B extends from raceway surface 13A to a smaller flange surface and a larger flange surface which will be described later. Nitrogen enriched layers 11B and 13B are regions higher in nitrogen concentration than an unnitrided portion 11C of outer ring 11 or an unnitrided portion 13C of inner ring 13. Nitrogen enriched layer 12B is formed in a surface of roller 12 including rolling surface 12A. Nitrogen enriched layer 12B of roller 12 is a region higher in nitrogen concentration than an unnitrided portion 12C of roller 12. Nitrogen enriched layers 11B, 12B, and 13B can be formed by any conventionally well-known method such as carbonitriding and nitriding.

Nitrogen enriched layer 12B may be formed only in roller 12, nitrogen enriched layer 11B may be formed only in outer ring 11, or nitrogen enriched layer 13B may be formed only in inner ring 13. Alternatively, a nitrogen enriched layer may be formed in two of outer ring 11, inner ring 13, and roller 12.

Figure 3:
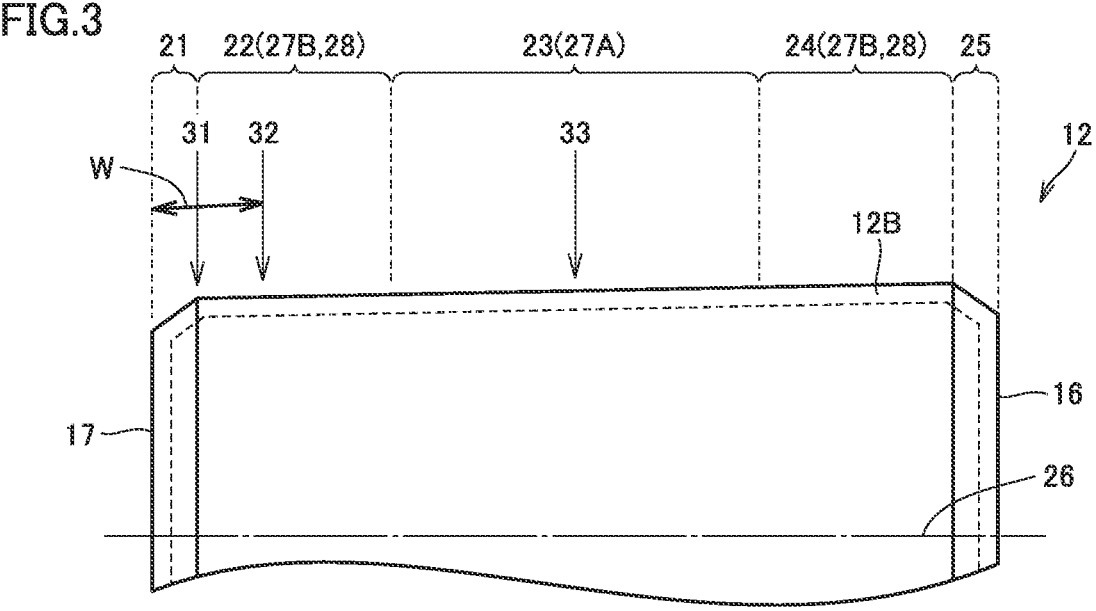
FIG. 3 is a partial cross-sectional schematic diagram of the tapered roller of the tapered roller bearing shown in FIG. 1.

As shown in FIG. 3, rolling surface 12A (see FIG. 2) of roller 12 includes crowned portions 22 and 24 located at opposing ends and a central portion 23 connecting crowned portions 22 and 24 to each other. Central portion 23 is uncrowned and linear in a cross section in a direction along a centerline 26 representing the rotation axis of roller 12. A chamfered portion 21 is formed between a smaller end face 17 which is a left end face of roller 12 and crowned portion 22. A chamfered portion 25 is also formed between a larger end face 16 which is a right end face and crowned portion 24.

Figure 4:
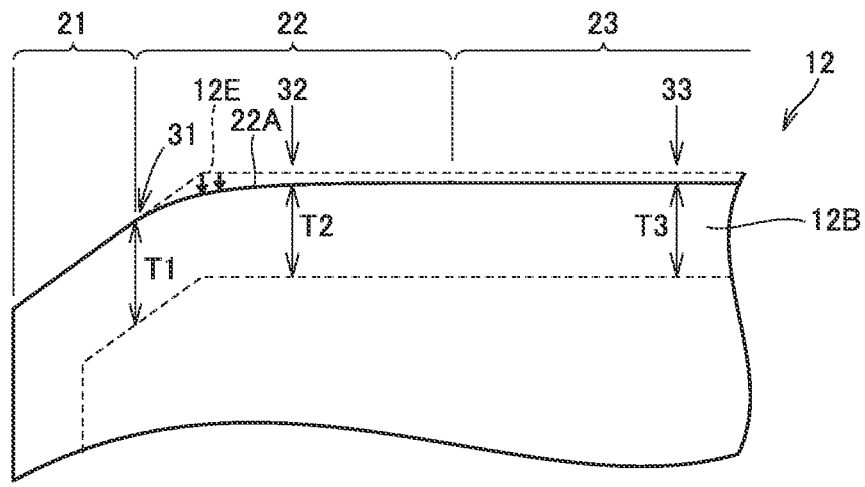
FIG. 4 is an enlarged partial cross-sectional schematic diagram of the tapered roller shown in FIG. 3.

In a method of manufacturing roller 12, in treatment for forming nitrogen enriched layer 12B (carbonitriding treatment), roller 12 is not crowned but an outer geometry of roller 12 is a yet-to-be-worked surface 12E shown with a dotted line in FIG. 4. After the nitrogen-enriched layer is formed in this state, roller 12 has a side surface worked as shown with an arrow in FIG. 4 as finishing so that crowned portions 22 and 24 are obtained as shown in FIGS. 3 and 4.

A depth of nitrogen-enriched layer 12B in roller 12, that is, a distance from the outermost surface of nitrogen-enriched layer 12B to the bottom of nitrogen-enriched layer 12B, is 0.2 mm or more. Specifically, at a first measurement point 31 representing a boundary point between chamfered portion 21 and crowned portion 22, a second measurement point 32 at a distance W of 1.5 mm from small end face 17, and a third measurement point 33 at the center of rolling surface 12A of roller 12, depths T1, T2, and T3 of nitrogen enriched layer 12B at these positions are 0.2 mm or more. The depth of nitrogen enriched layer 12B means a thickness of nitrogen enriched layer 12B in a radial direction orthogonal to centerline 26 of roller 12 and toward the outer circumference. Values of depths T1, T2, and T3 of nitrogen enriched layer 12B can be modified as appropriate, depending on a shape and a size of chamfered portions 21 and 25 and a process condition such as a condition for treatment to form nitrogen enriched layer 12B and a condition for finishing. For example, in the exemplary construction shown in FIG. 4, a crowning profile 22A is formed after formation of nitrogen enriched layer 12B as described above. Therefore, as shown in FIG. 4, depth T2 of nitrogen enriched layer 12B is smaller than other depths T1 and T3. By changing the process condition described above, however, relation in magnitude among the values of depths T1, T2, and T3 of nitrogen enriched layer 12B can be modified as appropriate.

A thickness of nitrogen enriched layers 11B and 13B in outer ring 11 and inner ring 13 representing a distance from the outermost surface to the bottom thereof is again not smaller than 0.2 mm. The thickness of nitrogen enriched layers 11B and 13B means a distance to nitrogen enriched layers 11B and 13B in a direction perpendicular to the outermost surface of nitrogen enriched layers 11B and 13B.

A crowning profile formed in crowned portions 22 and 24 of roller 12 is defined as below. More specifically, a sum of crown drops is expressed in a y-z coordinate system with a generatrix of rolling surface 12A of roller 12 being defined as the y axis and a direction orthogonal to the generatrix being defined as the z axis by an expression (1) below where $K_1$, $K_2$, and $z_m$ represent design parameters, Q represents a load, L represents a length of an effective contact portion of rolling surface 12A of roller 12 along the generatrix, E' represents an equivalent elastic modulus, a represents a length from an origin on the generatrix of the rolling surface of roller 12 to an end of the effective contact portion, and A is defined as $A=2K_1Q/\pi LE'$.

$$z(y) = A\ln\frac{1}{1-\left\{1-\exp\left(-\frac{z_m}{A}\right)\right\}\left(\frac{y-a}{K_2 a}+1\right)^2} \quad (1)$$

Figure 5:
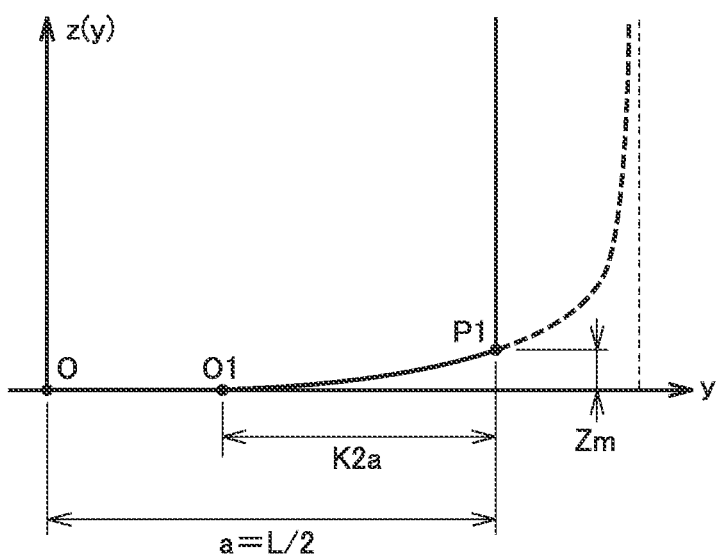
FIG. 5 is a y-z coordinate diagram representing an exemplary crowning profile.

FIG. 5 shows an exemplary crowning profile expressed in the expression (1) in the y-z coordinate system with the generatrix of roller 12 being defined as the y axis, origin O being taken on the generatrix of roller 12 at the central portion of the effective contact portion between inner ring 13 or outer ring 11 and roller 12, and a direction orthogonal to the generatrix (a direction of radius) being defined as the z axis. In FIG. 5, the ordinate represents the z axis and the abscissa represents the y axis. The effective contact portion refers to a portion of contact between inner ring 13 or outer ring 11 and roller 12 when roller 12 is uncrowned. Since the plurality of rollers 12 constituting tapered roller bearing 10 are crowned normally in line symmetry with respect to the z axis passing through the central portion of the effective contact portion, FIG. 5 only shows one crowning profile 22A.

Load Q, length L of the effective contact portion along the generatrix, and equivalent elastic modulus E' are given as design conditions, and length a from the origin to the end of the effective contact portion has a value determined by a position of the origin.

In the above expression (1), z(y) represents drop of crowning profile 22A at a position y in the direction of the generatrix of roller 12, and a coordinate of a starting point O1 of crowning profile 22A is expressed as $(a-K_2a, 0)$. Therefore, in the expression (1), y has a range of $y>(a-K_2a)$. In FIG. 5, since origin O is defined at the central portion of the effective contact portion, relation of a=L/2 is satisfied. A region from origin O to starting point O1 of crowning profile 22A is the uncrowned central portion (a straight portion). Therefore, when relation of $0\le y\le(a-K_2a)$ is satisfied, relation of $z(y)=0$ is satisfied.

Design parameter $K_1$ means a multiplying factor for load Q and geometrically means a degree of curvature of crowning profile 22A. Design parameter $K_2$ means a ratio of a length ym of crowning profile 22A along the generatrix to length a from origin O to the end of the effective contact portion along the generatrix ($K_2$=ym/a). Design parameter $z_m$ means drop at the end of the effective contact portion, that is, maximum drop of crowning profile 22A.

A crowning profile of the roller shown in FIG. 8 which will be described later is a full crowning profile without a straight portion defined by design parameter $K_2$=1, and ensures sufficient drop which does not cause edge loading. Excessive drop, however, leads to large machining allowance taken from a raw material as a material to be worked, which will invite increase in cost. Accordingly, design parameters $K_1$, $K_2$, and $z_m$ in the expression (1) are optimized as below.

Design parameters $K_1$, $K_2$, and $z_m$ can be optimized by various methods, and for example, a direct search method such as the Rosenbrock method can be adopted. Since surface-originating damage in a rolling surface of a roller depends on a contact pressure, by setting the contact pressure as an objective function for optimization, a crowning profile that prevents oil film breakage at a contact surface under lean lubrication can be obtained.

When the roller is provided with a logarithmic crowning profile, a straight portion (central portion 23) is preferably provided in a central portion of the rolling surface in order to secure working accuracy of the roller. In this case, $K_2$ is set to a constant value and $K_1$ and $z_m$ should only be optimized.

Figure 6:
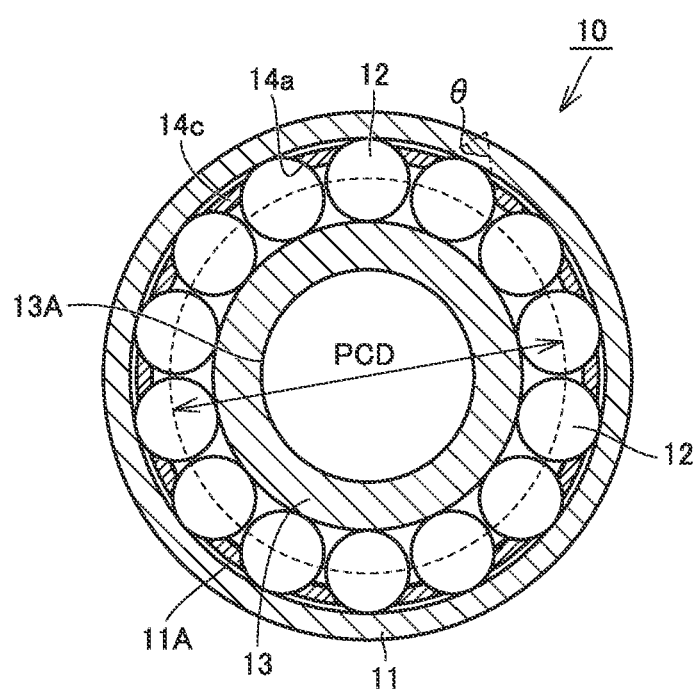
FIG. 6 is a lateral cross-sectional view showing a tapered roller bearing according to a first embodiment.

Roller Coefficient:

As shown in FIGS. 1 and 6, inner ring 13 includes conical raceway surface 13A and includes a larger flange portion 41 on the larger diameter side and a smaller flange portion 42 on the smaller diameter side of raceway surface 13A. Tapered roller bearing 10 has a roller coefficient γ which satisfies relation of γ>0.90. Roller coefficient γ is defined by a relational expression γ=(Z·DA)/(π·PCD) with Z represents the number of rollers, DA represents an average diameter of the roller, and PCD represents a pitch circle diameter.

Figure 7:
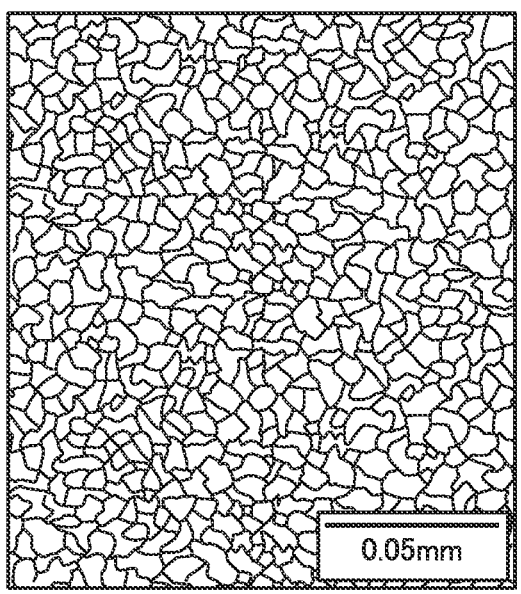
FIG. 7 schematically illustrates a microstructure, in particular a prior austenite crystal grain boundary, of a bearing component.

FIG. 7 shows a microstructure in nitrogen enriched layer 12B. A grain size number defined under the JIS, of a prior austenite crystal grain size in nitrogen enriched layer 12B in the present embodiment is equal to or greater than 10, and the grain size is sufficiently fine even in comparison with a conventional general hardened product.

A method of measuring a nitrogen concentration will be described. Bearing components such as outer ring 11, roller 12, and inner ring 13 are subjected to line analysis in a direction of depth by electron probe micro analysis (EPMA) in cross-sections perpendicular to surfaces of regions where nitrogen enriched layers 11B, 12B, and 13B are formed. Measurement is conducted by cutting each bearing component from a measurement position in a direction perpendicular to the surface to expose a cut surface and subjecting the surface to measurement. For example, roller 12 is cut in a direction perpendicular to centerline 26 from each of first measurement point 31 to third measurement point 33 shown in FIG. 3 to expose a cut surface. The cut surface is analyzed for a nitrogen concentration by EPMA at a plurality of measurement positions each located at a distance of 0.05 mm inward from the surface of roller 12. For example, five measurement positions are determined and an average value of measurement data obtained at the five locations is adopted as a nitrogen concentration of roller 12.

For outer ring 11 and inner ring 13, a central portion of raceway surfaces 11A and 13A in the direction of the central axis of the bearing is set as a measurement position, a cross-section along the central axis and a radial direction orthogonal to the central axis is exposed, and the cross-section is thereafter subjected to nitrogen concentration measurement in a manner the same as above.

Method of Measuring Distance from Outermost Surface to Bottom of Nitrogen Enriched Layer:

Outer ring 11 and inner ring 13 are subjected to hardness distribution measurement in a direction of depth from the surface in the cross-section subjected to measurement in the method of measuring a nitrogen concentration. A Vickers hardness measurement instrument can be employed for measurement. Tapered roller bearing 10 tempered at 500° C.×1 h is subjected to hardness measurement at a plurality of measurement points aligned in the direction of depth such as measurement points arranged at intervals of 0.5 mm. A region having a Vickers hardness of HV 450 or more is determined as a nitrogen enriched layer.

Roller 12 is subjected to hardness distribution measurement in the direction of depth as described above in a cross-section at first measurement point 31 shown in FIG. 3 to determine the region of the nitrogen enriched layer.

A prior austenite crystal grain size is measured by a method defined under JIS G0551: 2013. Measurement is conducted in the cross-section subjected to measurement in the method of measuring a distance to the bottom of the nitrogen enriched layer. A grain size number of a prior austenite crystal can thus be determined.

A crowning profile of roller 12 can be measured by any method. For example, the crowning profile may be measured by measuring a profile of roller 12 with a surface texture measurement instrument.

As set forth above, since nitrogen enriched layer 11B, 12B, or 13B having a sufficiently fine prior austenite crystal grain size has been formed in at least one of outer ring 11, inner ring 13, and roller 12 as the tapered roller, a rolling fatigue life can be long and a Charpy impact value, a fracture toughness value, ultimate strength, and the like can be improved.

Since rolling surface 12A of roller 12 is provided with a crowning profile having a contour line represented by such a logarithmic function (what is called a logarithmic crowning profile) that the expression (1) represents a sum of drops, local increase in contact pressure can be suppressed and wear of rolling surface 12A of roller 12 can be suppressed as compared with an example where a conventional crowning profile represented by a partially circular arc is provided.

An effect of the logarithmic crowning profile described above will now be described in more detail. FIG. 8 represents a contour line of a roller provided with a crowning profile with the contour line being represented by a logarithmic function and a contact surface pressure at a roller rolling surface as being superposed on each other. FIG. 9 represents a contour line of a roller with a portion between a partially arcuate crowning profile and a straight portion being represented by an auxiliary circular arc and a contact surface pressure at a roller rolling surface as being superposed on each other. In FIGS. 8 and 9, the ordinate on the left side represents drop (unit: mm) of the crowning profile. In FIGS. 8 and 9, the abscissa represents a position in the axial direction in the roller (unit: mm). In FIGS. 8 and 9, the ordinate on the right side represents a contact surface pressure (unit: GPa).

In an example where a contour line of the rolling surface of the tapered roller is formed in a shape including a partially arcuate crowning profile and a straight portion, even though a gradient at a boundary between the straight portion, the auxiliary circular arc, and the crowning profile is continuous as shown in FIG. 9, the contact surface pressure locally increases when the curvature is discontinuous. Therefore, an oil film may break or a surface may be damaged. Unless a lubricating film having a sufficient thickness is formed, wear due to metal-to-metal contact easily occurs. When the contact surface is partially worn, metal-to-metal contact is more likely in the vicinity thereof, which accelerates wear of the contact surface and leads to damage to the tapered roller.

Figure 8:
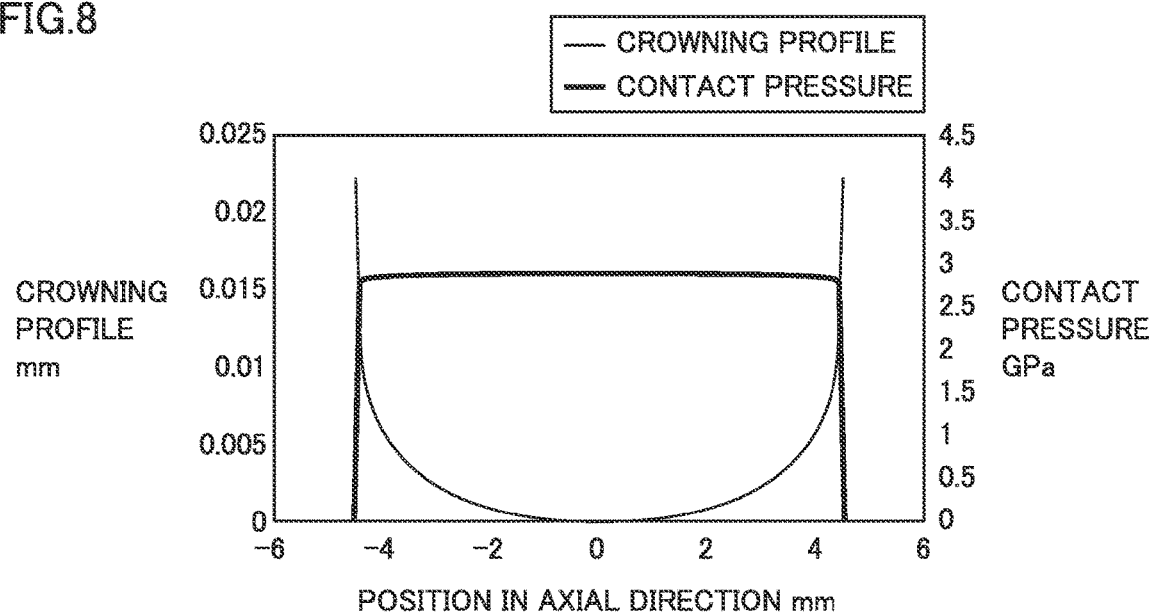
FIG. 8 shows a crowned roller with a contour line being represented by a logarithmic function.
Figure 9:
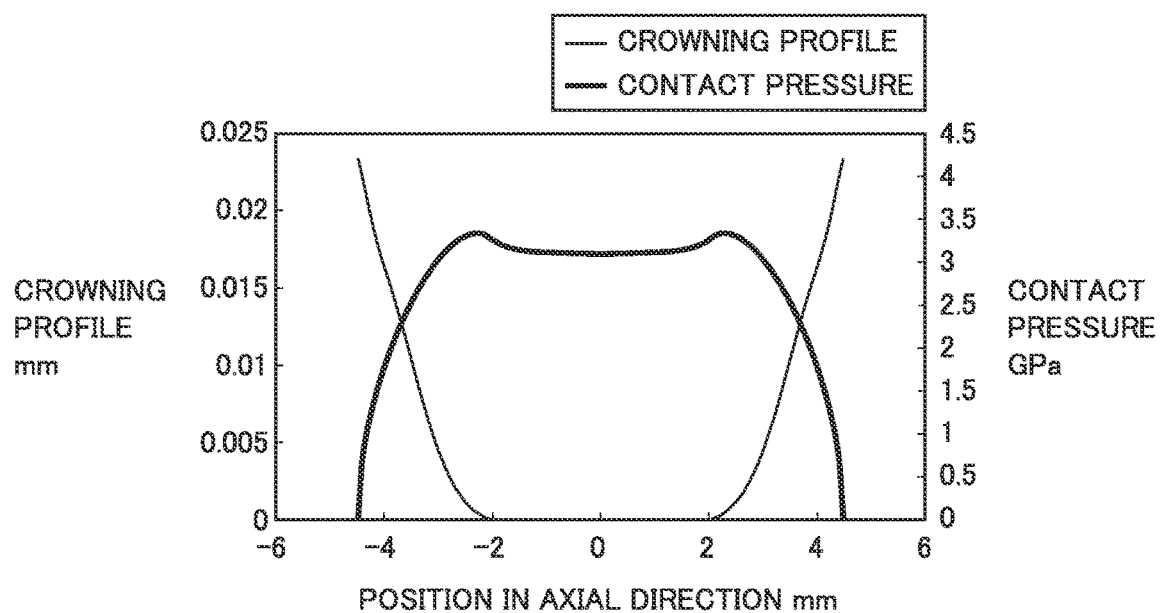
FIG. 9 shows a contour line of a roller provided with a partially arcuate crowning profile and a straight portion and a contact surface pressure at a roller rolling surface as being superimposed on each other.

When the rolling surface of the tapered roller serving as a contact surface is provided with a crowning profile defined by a contour line represented by a logarithmic function as shown, for example, in FIG. 8, a local contact pressure is lower and wear of the contact surface is less likely than in an example where a crowning profile represented by a partial circular arc in FIG. 9 is provided. Therefore, even when lubricant present on the rolling surface of the tapered roller is reduced to a small amount or reduced in viscosity and a lubricating film is reduced in thickness, the contact surface can be prevented from being worn and the tapered roller can be prevented from being damaged. FIGS. 8 and 9 show the contour line of the roller with origin O of the abscissa being set at the central portion of the effective contact portion between the inner ring or the outer ring and the roller in a rectangular coordinate system with the abscissa representing the direction of the generatrix of the roller and the ordinate representing a direction orthogonal to the generatrix and show a contact surface pressure as being superimposed on the former with the contact pressure being represented on the ordinate. Thus, tapered roller bearing 10 exhibiting a long lifetime and high durability can be provided by adopting the construction as described above.

In tapered roller bearing 10, a nitrogen concentration in nitrogen enriched layers 11B, 12B, and 13B at a position of depth of 0.05 mm from the outermost surface is not lower than 0.1 mass %. In this case, since the nitrogen concentration in the outermost surface of nitrogen enriched layers 11B, 12B, and 13B can have a sufficient value, a hardness of the outermost surface of nitrogen enriched layers 11B, 12B, and 13B can be sufficiently high. Conditions such as the prior austenite crystal grain size in grain size number, the distance to the bottom of the nitrogen enriched layer, and the nitrogen concentration described above are preferably satisfied at least at first measurement point 31 in FIG. 3.

In tapered roller bearing 10, at least one of outer ring 11, inner ring 13, and roller 12 in which nitrogen enriched layers 11B, 12B, and 13B are formed is made of steel. Steel at least contains at least 0.6 mass % and at most 1.2 mass % of carbon (C), at least 0.15 mass % and at most 1.1 mass % of silicon (Si), and at least 0.3 mass % and at most 1.5 mass % of manganese (Mn) in a portion other than nitrogen enriched layers 11B, 12B, and 13B, that is, in unnitrided portions 11C, 12C, and 13C. In tapered roller bearing 10, steel may further contain at most 2.0 mass % of chromium. In this case, nitrogen enriched layers 11B, 12B, and 13B constructed as defined in the present embodiment can easily be formed by heat treatment or the like which will be described later.

In tapered roller bearing 10, at least one of design parameters $K_1$, $K_2$, and $z_m$ in the expression (1) is optimized with a contact surface pressure between roller 12 and outer ring 11 or between roller 12 and inner ring 13 being defined as an objective function.

While design parameters $K_1$, $K_2$, and $z_m$ are optimized and determined with any one of a contact surface pressure, stress, and a lifetime being defined as an objective function, damage originating from a surface depends on a contact surface pressure. According to the embodiment, design parameters $K_1$, $K_2$, and $z_m$ are optimized and set with a contact surface pressure being defined as an objective function, and hence a crowning profile that can prevent the contact surface from being worn even under a condition where lubricant is lean can be obtained.

In tapered roller bearing 10, at least one of outer ring 11 and inner ring 13 includes nitrogen enriched layer 11B or 13B. In this case, in at least one of outer ring 11 and inner ring 13, nitrogen enriched layer 11B or 13B made finer in crystal structure is formed so that outer ring 11 or inner ring 13 long in lifetime and high in durability can be obtained.

In tapered roller bearing 10, roller 12 includes nitrogen enriched layer 12B. In this case, in roller 12, nitrogen enriched layer 12B made finer in crystal structure is formed so that roller 12 long in lifetime and high in durability can be obtained.

Figure 10:
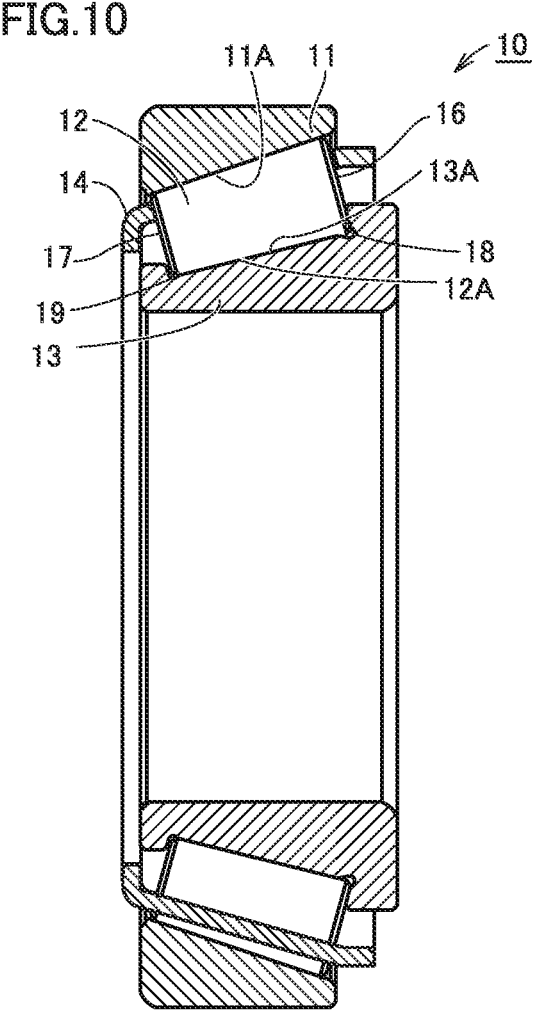
FIG. 10 is a schematic cross-sectional view more detailed than FIG. 1 for defining a larger flange surface and a smaller flange surface of the tapered roller bearing in the present embodiment.

FIG. 10 shows a manner premised on the basic construction in FIG. 1 and including features close to those in the present embodiment. Referring to FIG. 10, tapered roller bearing 10 in the present embodiment is provided with a larger flange surface 18 on a larger diameter side of raceway surface 13A of inner ring 13 and a smaller flange surface 19 on a smaller diameter side thereof. A larger end face 16 in contact with larger flange surface 18 is provided on the larger diameter side of roller 12 and a smaller end face 17 in contact with smaller flange surface 19 is provided on the smaller diameter side of roller 12.

Larger flange surface 18 is formed with an end on the larger diameter side of raceway surface 13A and a grinding undercut being interposed. Larger flange surface 18 guides roller 12 as it comes in contact with larger end face 16 of roller 12 while tapered roller bearing 10 is used. Smaller flange surface 19 is formed with an end on the smaller diameter side of raceway surface 13A and a grinding undercut being interposed.

Figure 11:
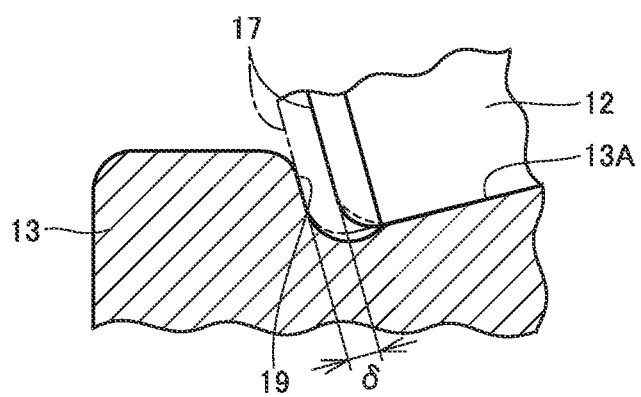
FIG. 11 is an enlarged cross-sectional view of a main portion in FIG. 10.

As shown as being enlarged in FIG. 11, smaller flange surface 19 of inner ring 13 is finished to a ground surface in parallel to smaller end face 17 of roller 12 and in surface contact with smaller end face 17 of roller 12 in an initial assembled state shown with a chain dotted line in the figure. Smaller end face 17 is distant from smaller flange surface 19 of roller 12. A gap δ between smaller flange surface 19 of inner ring 13 and smaller end face 17 of roller 12 provided while roller 12 shown with a solid line is set in place, that is, while larger end face 16 of roller 12 is in contact with larger flange surface 18 of inner ring 13, is within a restricted dimension range defined as δ≤0.4 mm. Thus, the number of rotations required until roller 12 is set in place in running-in can be decreased and a running-in period can be shorter.

Figure 12:
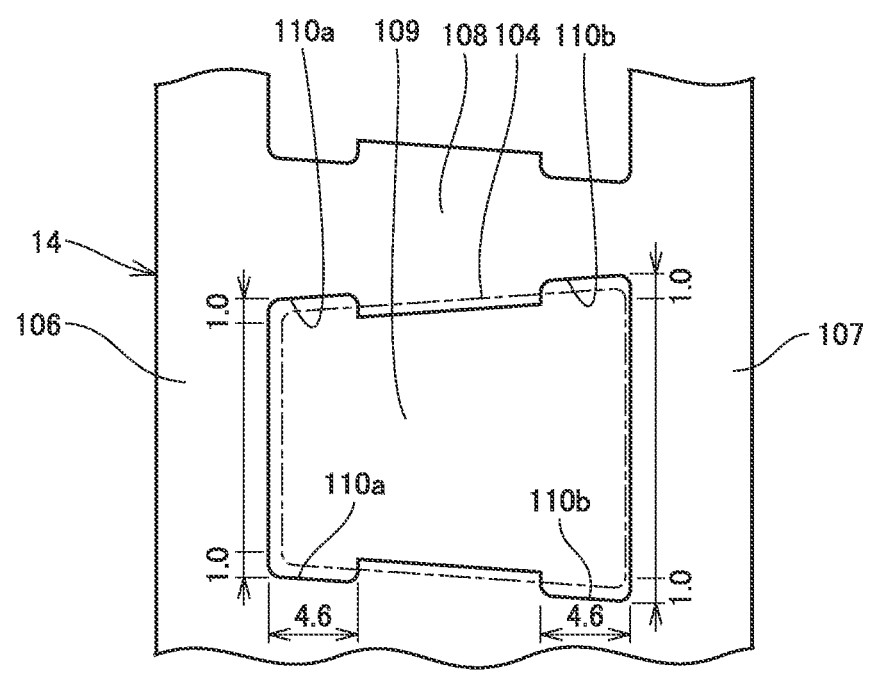
FIG. 12 is a developed plan view of a cage of the tapered roller bearing according to the present embodiment.

As shown in FIG. 12, cage 14 is constituted of a smaller annular portion 106 continuous on a side of a smaller-diameter end face of roller 12, a larger annular portion 107 continuous on a side of a larger-diameter end face of roller 12, and a plurality of posts 108 that couple smaller annular portion 106 and larger annular portion 107 to each other, and the cage is provided with a pocket 109 in such a trapezoidal shape that a portion accommodating a smaller diameter side of roller 12 is defined as a smaller width side and a portion accommodating a larger diameter side is defined as a larger width side. Pockets 109 are arranged at prescribed intervals in a circumferential direction of tapered roller bearing 10. Cage 14 accommodates and holds the plurality of tapered rollers 12 in the plurality of pockets 109. On the smaller width side and the larger width side of pocket 109, two notches 110a and two notches 110b are provided on opposing sides of post 108, and each of notches 110a and 110b has a depth of 1.0 mm and a width of 4.6 mm.

By providing a notch having a width in the post on the smaller width side of pocket 109 of cage 14 from a boundary between smaller annular portion 106 and the post toward larger annular portion 107, lubricating oil that flows from the inner diameter side of cage 14 toward the inner ring is quickly discharged from the notch toward the outer ring on the outer diameter side, and an edge of smaller annular portion 106 on a side of pocket 109 is in such a shape that a base portion on the smaller width side of pocket 109 extends to the post.

The above is summarized. Tapered roller bearing 10 in the present embodiment shown, for example, in FIG. 10 includes outer ring 11, inner ring 13, and a plurality of rollers 12. Outer ring 11 includes raceway surface 11A around an inner circumferential surface thereof. Inner ring 13 includes raceway surface 13A around an outer circumferential surface thereof and is arranged on a radially inner side of outer ring 11. The plurality of rollers 12 are disposed between raceway surface 11A and raceway surface 13A and the roller includes rolling surface 12A to be in contact with raceway surface 11A and raceway surface 13A. Cage 14 includes a plurality of pockets 109 arranged at prescribed intervals in a circumferential direction and accommodates and holds the plurality of rollers 12 in the plurality of pockets 109. Cage 14 includes smaller annular portion 106 continuous on a smaller-diameter end face side of roller 12, larger annular portion 107 continuous on a larger-diameter end face side of roller 12, and a plurality of posts 108 that couple annular portions 106 and 107 to each other. Pocket 109 is provided in such a trapezoidal shape that a portion accommodating a smaller diameter side of roller 12 is located on a smaller width side and a portion accommodating a larger diameter side is located on a larger width side. By providing notches 110a and 110b having a width in post 108 on the smaller width side of pocket 109 of cage 14 from a boundary between smaller annular portion 106 and post 108 toward larger annular portion 107, lubricating oil that flows from an inner diameter side of cage 14 toward inner ring 13 is quickly discharged from notches 110a and 110b toward outer ring 11 on an outer diameter side, and an edge of smaller annular portion 106 on a side of pocket 109 is in such a shape that a base portion on the smaller width side of pocket 109 extends to post 108. At least any one of outer ring 11, inner ring 13, and the plurality of rollers 12 includes nitrogen enriched layer 11B, 12B, or 13B formed on a surface layer of raceway surface 11A, raceway surface 13A, or rolling surface 12A. A distance from an outermost surface of the surface layer to the bottom of nitrogen enriched layer 11B, 12B, or 13B is not shorter than 0.2 mm. Crowned portions 22 and 24 are formed in rolling surface 12A of roller 12. A sum of drops of crowned portions 22 and 24 is expressed in a y-z coordinate system with a generatrix of the rolling surface of the tapered roller being defined as a y axis and a direction orthogonal to the generatrix being defined as a z axis, in the expression (1) where $K_1$, $K_2$, and $z_m$ represent design parameters, Q represents a load, L represents a length in a direction of the generatrix of an effective contact portion of the rolling surface of the tapered roller, E' represents an equivalent elastic modulus, a represents a length from an origin on the generatrix of the rolling surface of the tapered roller to an end of the effective contact portion, and A is defined as A=2K₁Q/πLE'. In the description so far and in description hereafter, tapered roller bearing 10 in the present embodiment is premised on the features described above in the present paragraph.

Some tapered roller bearings included in a portion where lubricating oil flows in from the outside are provided with a notch in a pocket of a cage so that lubricating oil that flows in as being divided into lubricating oil on the outer diameter side and lubricating oil on the inner diameter side of the cage passes through the notch and flow of lubricating oil inside the bearing is improved. It has been found, however, that, in a tapered roller bearing in which lubricating oil flows into the inside of the bearing as being divided into lubricating oil on the outer diameter side and lubricating oil on the inner diameter side of the cage, torque loss increases with increase in ratio of lubricating oil that flows from the inner diameter side of the cage toward the inner ring. The reason may be as set forth below.

Lubricating oil that flows from the outer diameter side of the cage toward the outer ring smoothly flows along the raceway surface thereof toward the larger diameter side of the tapered roller and flows out of the inside of the bearing because there is no obstacle in an inner-diameter surface of the outer ring. Lubricating oil that flows from the inner diameter side of the cage toward the inner ring, however, is blocked by a larger flange when it flows along the raceway surface thereof and passes toward the larger diameter side of the tapered roller because of the presence of the larger flange on an outer-diameter surface of the inner ring, and lubricating oil tends to stay in the inside of the bearing. Therefore, with increase in ratio of lubricating oil that flows from the inner-diameter side of the cage toward the inner ring, an amount of lubricating oil that stays in the inside of the bearing may increase and lubricating oil that stays may become flow resistance against rotation of the bearing, which may lead to increase in torque loss.

In tapered roller bearing 10 according to the first embodiment, a notch is provided in a post on the smaller-width side of the trapezoidal pocket of the cage so that lubricating oil that flows from the inner-diameter side of the cage toward the inner ring is quickly discharged from the notch toward the outer ring on the smaller-width side of the pocket that accommodates the smaller-diameter side of the tapered roller, an amount of lubricating oil which reaches the larger flange along the raceway surface of the inner ring is decreased, an amount of lubricating oil that stays in the inside of the bearing is decreased, and torque loss due to flow resistance of the lubricating oil can be reduced.

Figure 13:
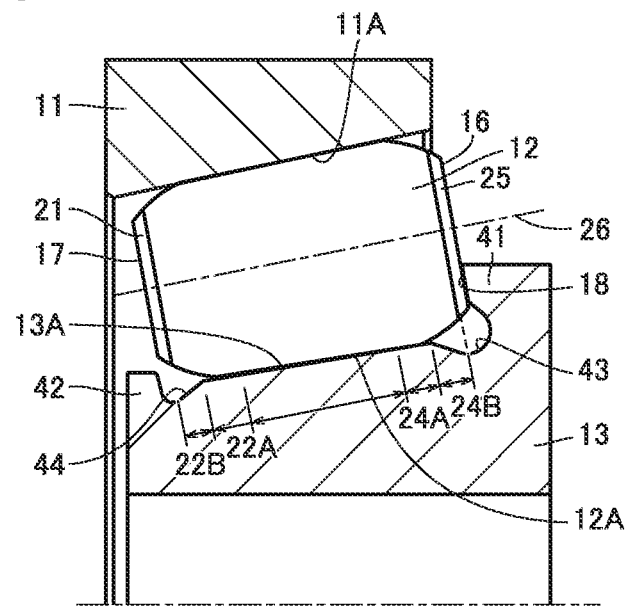
FIG. 13 is a schematic cross-sectional view more detailed than FIG. 1 for defining a larger flange, a smaller flange, and an undercut of the tapered roller bearing in the present embodiment.
Figure 14:
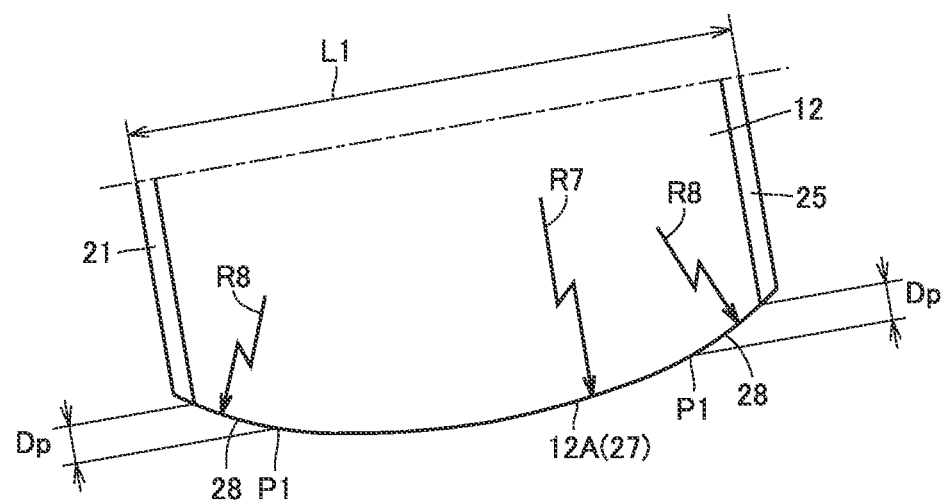
FIG. 14 is a diagram showing a crowning profile of the tapered roller bearing in FIG. 13.

As shown in FIGS. 13 and 14, in the tapered roller bearing in the present embodiment, a first grinding undercut 43 is provided at a corner where raceway surface 13A and a larger flange 41 meet each other, and a second grinding undercut 44 is provided at a corner between raceway surface 13A and a smaller flange 42. Raceway surface 13A has a linear generatrix extending in an axial direction of the inner ring. Around an inner circumference of outer ring 11, raceway surface 11A opposed to raceway surface 13A is formed, no flange is provided therewith, and raceway surface 11A has a linear generatrix extending in an axial direction of the outer ring.

As shown in FIGS. 13 and 14, in rolling surface 12A around the outer circumference of roller 12, crowning profiles 22A and 22B as crowned portion 22 and crowning profiles 24A and 24B as crowned portion 24 are formed, and opposing ends of roller 12 are provided with chamfered portions 21 and 25. Crowned portions 22 and 24 of rolling surface 12A can be considered as a crowning profile formed portion where a crowning profile is formed. The crowning profile formed portion is specifically formed as a contact area crowned portion 27 and a non-contact area crowned portion 28. Of these, contact area crowned portion 27 is within a range of the axial direction of raceway surface 13A and in contact with raceway surface 13A. Non-contact area crowned portion 28 is out of the range in the axial direction of raceway surface 13A and not in contact with raceway surface 13A.

Contact area crowned portion 27 and non-contact area crowned portion 28 have generatrices extending in the axial direction of the roller expressed by functions different from each other and being smoothly continuous at a connection point P1. In the vicinity of connection point P1, a curvature R8 of the generatrix of non-contact area crowned portion 28 is set to be smaller than a curvature R7 of the generatrix of contact area crowned portion 27. "Being smoothly continuous" refers to being continuous without forming a corner and ideally refers to the generatrix of contact area crowned portion 27 and the generatrix of non-contact area crowned portion 28 being continuous to have a tangential line in common at a continuous point, that is, such a function that the generatrices can continuously be differentiated at the continuous point.

According to such a construction, a crowned portion is formed in rolling surface 12A around the outer circumference of roller 12, so that a grindstone can be applied to rolling surface 12A in a more necessary and sufficient manner than in formation of a crowned portion only in raceway surface 13A. Therefore, poor working of rolling surface 12A can be prevented. Crowned portions 22 and 24 formed in rolling surface 12A can bring about lowering in contact pressure or stress in a contact portion and a longer lifetime of tapered roller bearing 10. In the vicinity of connection point P1 between contact area crowned portion 27 and non-contact area crowned portion 28, curvature R8 of the generatrix of non-contact area crowned portion 28 is smaller than curvature R7 of the generatrix of contact area crowned portion 27, so that drops at opposing ends of roller 12 can be reduced. Therefore, as compared, for example, with an example of a conventional crowning profile of a single circular arc, an amount of grinding can be suppressed, efficiency in working of roller 12 can be improved, and manufacturing cost can be reduced.

The generatrix of contact area crowned portion 27 is defined by a logarithmic curve of a logarithmic crowning profile expressed in an expression below.

$$z(y) = A\ln\cfrac{1}{1-\left\{1-\exp\left(-\cfrac{z_m}{A}\right)\right\}\left(\cfrac{y-a}{K_2 a}+1\right)^2} \quad (1)$$

Contact area crowned portion 27 expressed by the logarithmic crowning profile can lower a contact pressure or stress in a contact portion so that tapered roller bearing 10 can have a longer lifetime.

Figure 15:
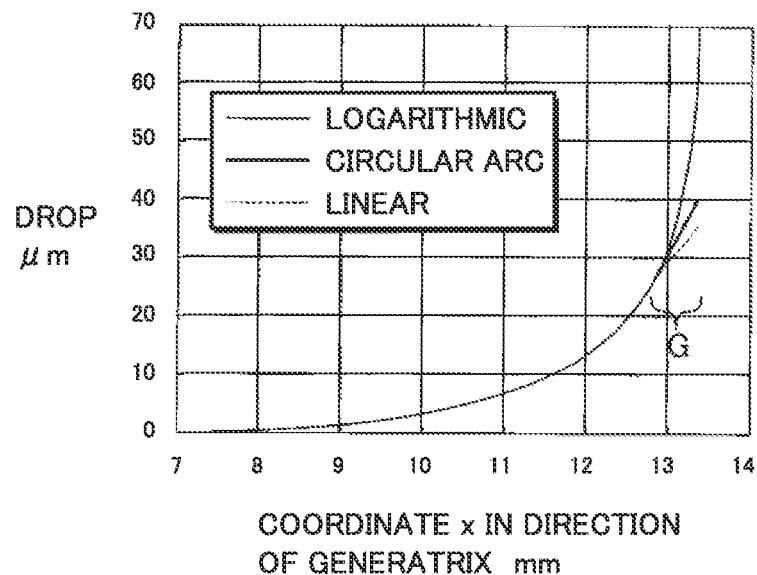
FIG. 15 is a diagram showing relation between a coordinate in a direction of a generatrix and drop of a tapered roller in FIG. 13.

When a crowning profile is optimized by a mathematical optimization approach in connection with $K_1$ and $z_m$ in the expression (1) above, under the present condition, a crowning profile as shown with "logarithmic" in FIG. 15 is obtained. Largest drop of the crowning profile of roller 12 at this time is 69 μm. A region shown with G in FIG. 15, however, corresponds to crowned portion 24B facing first grinding undercut 43 and second grinding undercut 44 of inner ring 13 in FIG. 13, and it does not come in contact with inner ring 13. Therefore, region G of roller 12 does not have to be provided with the logarithmic crowning profile and it may be defined by a straight line, a circular arc, or other functions. Even though region G of roller 12 is defined by a straight line, a circular arc, or other functions, a contact pressure distribution is identical to that in an example in which roller 12 is entirely provided with a logarithmic crowning profile, and a function thereof is comparable.

The approach to mathematical optimization of the logarithmic crowning profile will be described.

By appropriately selecting $K_1$ and $z_m$ in a functional expression expressive of the logarithmic crowning profile, the optimum logarithmic crowning profile can be designed.

A crowning profile is generally designed to reduce a maximum value of stress or contact pressure in a contact area. It is assumed that a rolling fatigue life occurs in accordance with von Mises yield criterion and hence $K_1$ and $z_m$ are selected to minimize the maximum value of von Mises equivalent stress.

$K_1$ and $z_m$ can be selected with the use of an appropriate mathematical optimization approach. Though various algorithms have been suggested for the mathematical optimization approach, a direct search method representing one of those algorithms can allow optimization without using a differential coefficient of a function and is useful when an objective function and a variable cannot directly be expressed by a mathematical formula. Optimum values of $K_1$ and $z_m$ are determined by the Rosenbrock method representing one of the direct search methods.

Figure 16:
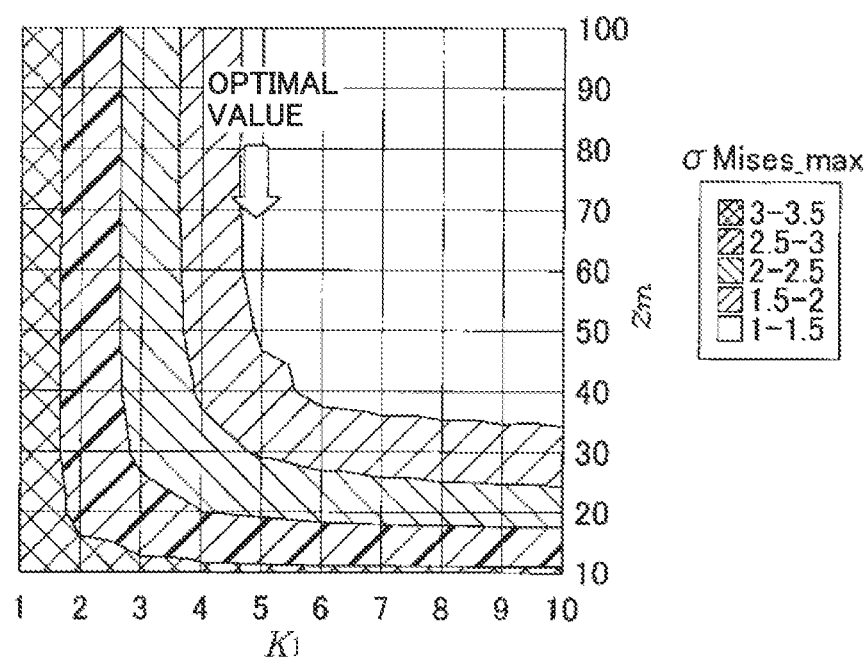
FIG. 16 is a diagram showing relation between a maximum value of von Mises equivalent stress and a logarithmic crowning parameter.

Under the conditions above, that is, when a radial load effective to 35% of a basic dynamic rated load is applied to the tapered roller bearing having the bearing number of 30316 and misalignment is 1/600, a maximum value sMises_max of von Mises equivalent stress and logarithmic crowning parameters $K_1$ and $z_m$ assume relation as in FIG. 16. When appropriate initial values are given to $K_1$ and $z_m$ and $K_1$ and $z_m$ are modified under the rules of the Rosenbrock method, a combination of optimum values in FIG. 16 is derived and sMises_max is minimized.

So long as contact between roller 12 and inner ring 13 is considered, any crowning profile in region G in FIG. 15 may be applicable. When contact with outer ring 11 or formability by a grindstone during working is taken into consideration, however, it is not desirable that gradient at point P1 of connection with a logarithmically crowned portion is smaller than a gradient at the logarithmically crowned portion. Since drop will increase when gradient greater than gradient of the logarithmically crowned portion is given to the crowning profile in region G, this is also undesirable. In other words, the crowning profile in region G and the logarithmic crowning profile are desirably designed to smoothly be continuous to each other with their gradients matching with each other at connection point P1. In FIG. 15, a linear crowning profile in region G of roller 12 is shown with a dotted line and an arcuate crowing profile thereof is shown with a bold solid line. When the crowning profile in region G is linear, drop Dp of the crowning profile of roller 12 is, for example, 36 μm. When the crowning profile in region G is arcuate, drop Dp of the crowning profile of roller 12 is, for example, 40 μm.

Figure 17:
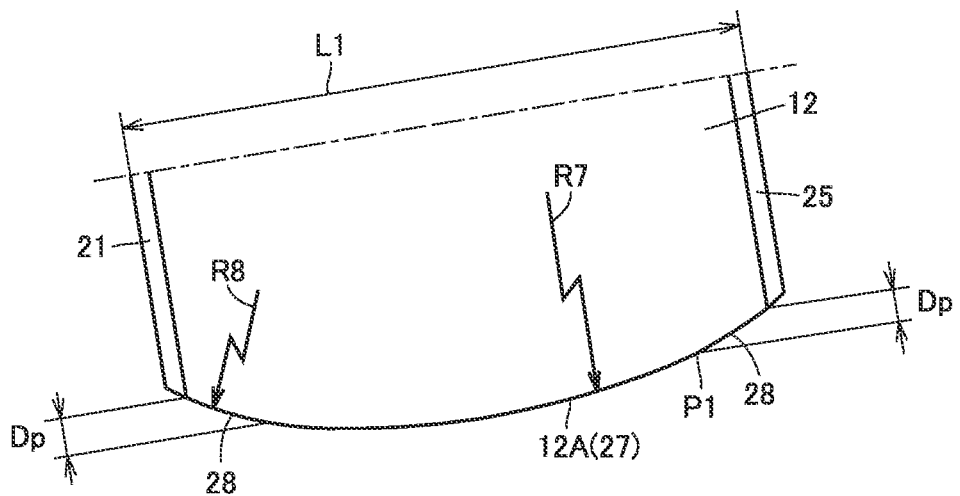
FIG. 17 is a diagram showing a crowning profile of a tapered roller included in a tapered roller bearing according to a first modification to FIG. 13.

One or both of portions on the larger and smaller diameter sides of the generatrix of non-contact area crowned portion 28 may be arcuate. In this case, drop Dp can be made smaller than in an example in which the generatrix of the entire roller rolling surface is represented, for example, by a logarithmic curve. Accordingly, an amount of grinding can be reduced. As shown in FIG. 17, one or both of portions on the larger and smaller diameter sides of the generatrix of non-contact area crowned portion 28 may be linear (in the example in FIG. 17, only a portion on the larger diameter side being linear). In this case, drop Dp can further be made smaller than in an example in which the generatrix of non-contact area crowned portion 28 is arcuate.

A part or the entirety of the generatrix of contact area crowned portion 27 may be represented by the logarithmic crowning profile expressed in the expression (1). Owing to contact area crowned portion 27 represented by the logarithmic crowning profile, a contact pressure or stress in the contact area can be lowered so that the tapered roller bearing can have a longer lifetime.

Figure 18:
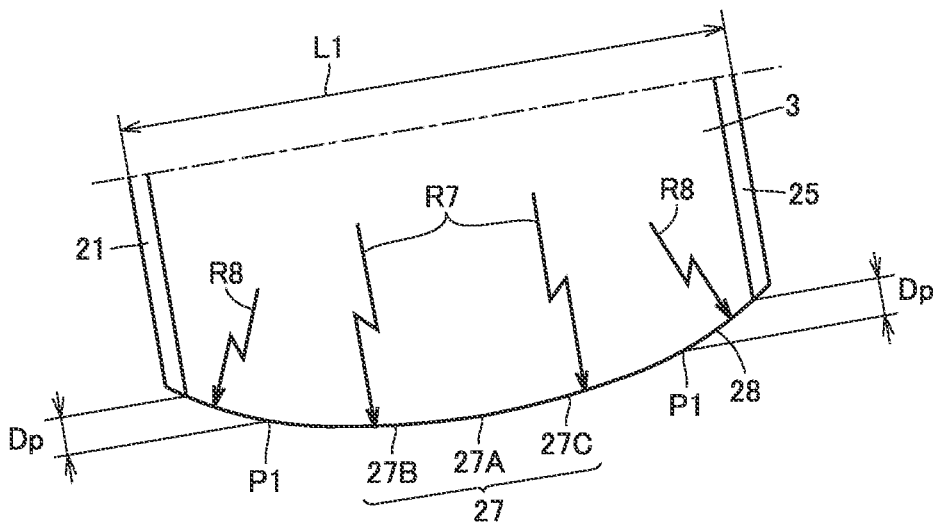
FIG. 18 is a diagram showing a crowning profile of a tapered roller included in a tapered roller bearing according to a second modification to FIG. 13.

As shown in FIG. 18, the generatrix of contact area crowned portion 27 may be represented by a straight portion 27A (identical in meaning to central portion 23 in FIG. 3) formed as being flat along the axial direction of the roller and a portion 27B formed by a logarithmic curve of the logarithmic crowning profile.

In order to secure working accuracy of a crowning profile, straight portion 27A is desirably provided in the outer circumference of roller 12. When crowned portions 22 and 24 in symmetry between a portion on the smaller diameter side and a portion on the larger diameter side with the center in the axial direction of the roller being defined as the reference are assumed, among the design parameters in the expression (1) of the logarithmic crowning profile, $K_2$ is fixed and $K_1$ and $z_m$ are to be designed.

A method of manufacturing a tapered roller bearing will be described below with reference to FIGS. 19 to 22.

Figure 19:
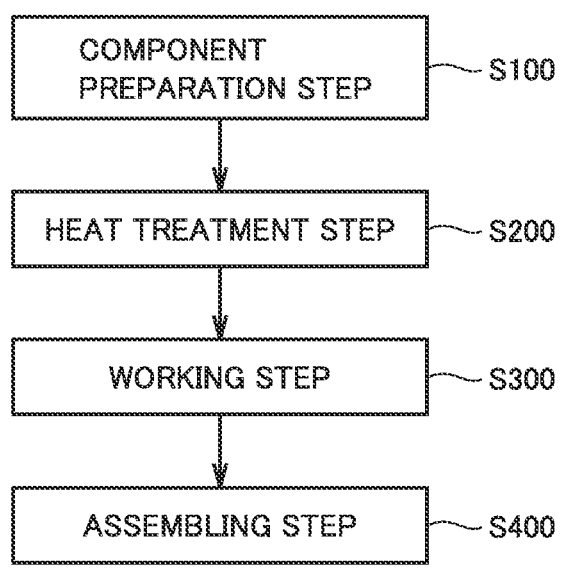
FIG. 19 is a flowchart for illustrating a method of manufacturing a tapered roller bearing.

As shown in FIG. 19, initially, a component preparation step (S100) is performed. In this step (S100), members to be bearing components such as outer ring 11, inner ring 13, roller 12, and cage 14 are prepared. A member to be roller 12 is uncrowned, and a surface of the member is yet-to-be-worked surface 12E as shown with a dotted line in FIG. 4. Roller 12 is formed to include larger end face 16 and smaller end face 17 as shown in FIG. 10 and inner ring 13 is formed to include larger flange surface 18 and smaller flange surface 19 as shown in FIG. 10.

Figure 20:
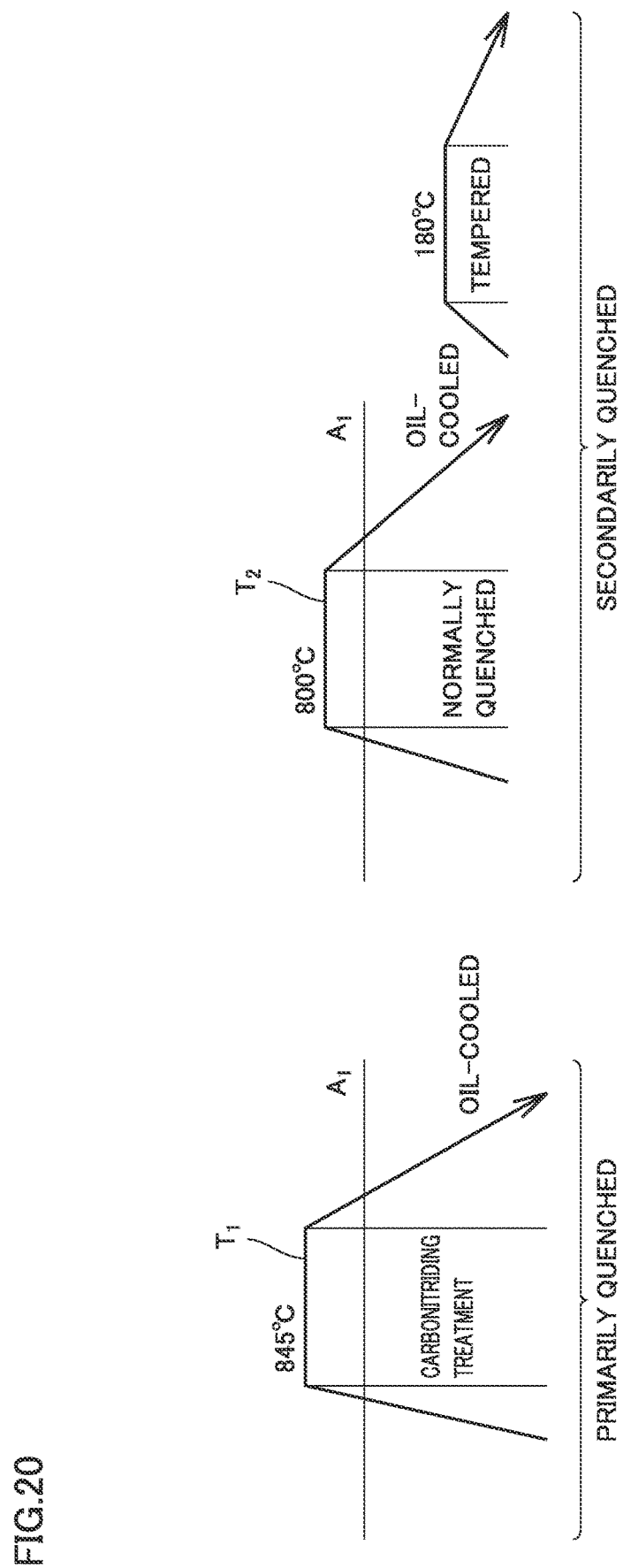
FIG. 20 is a schematic diagram showing a heat treatment pattern in a heat treatment step in FIG. 19.
Figure 21:
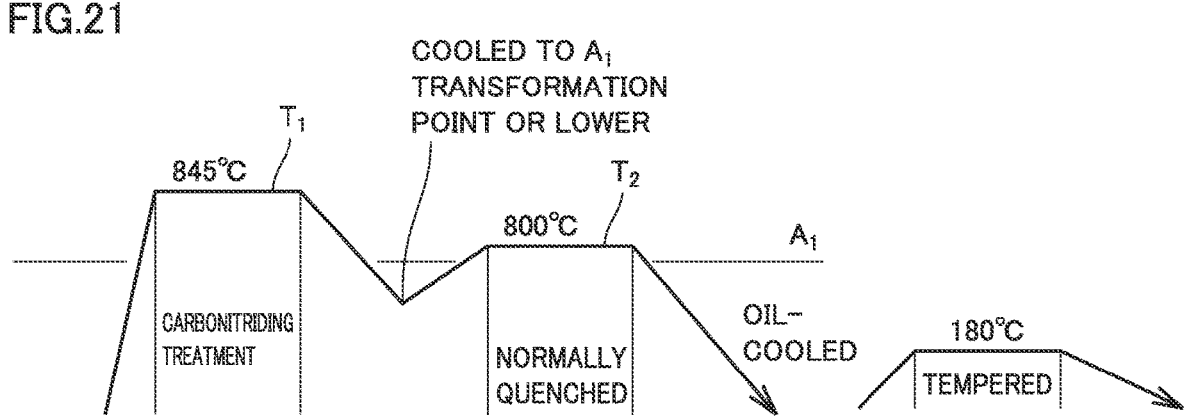
FIG. 21 is a schematic diagram showing a modification to the heat treatment pattern shown in FIG. 20.
Figure 22:
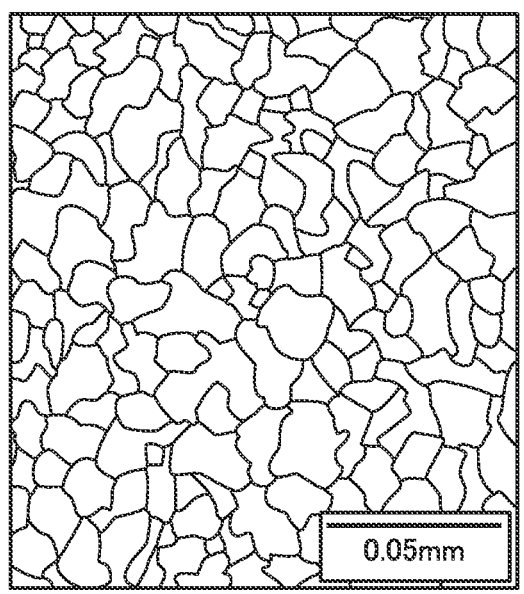
FIG. 22 is a schematic diagram illustrating a microstructure, in particular a prior austenite crystal grain boundary, of a bearing component as a comparative example.

Then, a heat treatment step (S200) is performed. In this step (S200), prescribed heat treatment is performed to control characteristics of bearing components. For example, in order to form nitrogen enriched layer 11B, 12B, or 13B according to the present embodiment in at least one of outer ring 11, roller 12, and inner ring 13, carbonitriding or nitriding, quenching, tempering, and the like are performed. An exemplary heat treatment pattern in this step (S200) is shown in FIG. 20. FIG. 20 shows a heat treatment pattern representing a method of performing primary quenching and secondary quenching. FIG. 21 shows a heat treatment pattern representing a method in which a material is cooled to a temperature lower than an $A_1$ transformation point during quenching and thereafter the material is reheated and finally quenched. In these figures, in treatment $T_1$, carbon, nitrogen, and the like are diffused through a steel matrix and carbon is also sufficiently dissolved therein, and thereafter the material is cooled to a temperature lower than the $A_1$ transformation point. Then, in treatment $T_2$ shown in the figure, the material is reheated to a temperature lower than in treatment $T_1$ and oil-quenched. Thereafter, the material is, for example, tempered at a heating temperature of 180° C.

According to the heat treatment, as compared with ordinary quenching, that is, carbonitriding treatment followed by quenching once, cracking strength can be improved and a rate of change in dimension over time can be lowered while a surface layer portion of a bearing component is carbonitrided. According to the heat treatment step (S200), nitrogen enriched layers 11B, 12B, and 13B as a quenched structure can have such a microstructure as shown in FIG. 7 that a grain size of prior austenite crystal grains is equal to or less than ½ of that in a microstructure in a conventional quenched structure shown in FIG. 22. The bearing component subjected to the heat treatment has a long life against rolling fatigue and increased cracking strength, and can also achieve a reduced rate of change in dimension over time.

Then, a working step (S300) is performed. In this step (S300), the material is finished to have a final shape of each bearing component. Roller 12 is provided with crowning profile 22A and chamfered portion 21 by machining such as cutting, as shown in FIG. 4.

Then, an assembling step (S400) is performed. In this step (S400), tapered roller bearing 10 shown in FIG. 10 is obtained by assembling the bearing components prepared as described above. Thus, tapered roller bearing 10 shown in FIG. 1 can be manufactured.

Experimental Example 1

<Samples>

Four types of tapered rollers of samples Nos. 1 to 4 were prepared as samples. The model number of the tapered rollers was 30206. As a material for the tapered rollers, a JIS SUJ2 material (1.0 mass % of C-0.25 mass % of Si-0.4 mass % of Mn-1.5 mass % of Cr) was used.

Sample No. 1 was carbonitrided and quenched, and thereafter provided at opposing ends with a logarithmic crowning profile according to the present embodiment shown in FIG. 5. The sample was carbonitrided at 845° C. for 150 minutes. The sample was carbonitrided in an atmosphere of RX gas+ammonia gas. Sample No. 2 was carbonitrided and quenched similarly to sample No. 1, and thereafter provided with a partially arcuate crowning profile shown in FIG. 9.

Sample No. 3 was subjected to the heat treatment pattern shown in FIG. 20, and thereafter provided at opposing ends with a logarithmic crowning profile according to the present embodiment shown in FIG. 5. The sample was carbonitrided at 845° C. for 150 minutes. The sample was carbonitrided in an atmosphere of RX gas+ammonia gas. The sample was finally quenched at 800° C.

Sample No. 4 was subjected to the heat treatment pattern shown in FIG. 20, and thereafter provided at opposing ends with a logarithmic crowning profile according to the present embodiment shown in FIG. 5. The sample was finally quenched at 800° C. In order to achieve a nitrogen concentration not lower than 0.1 mass % in the nitrided enriched layer at a position of depth of 0.05 mm from the outermost surface of the sample, the sample was carbonitrided at 845° C. for 150 minutes. The sample was carbonitrided in an atmosphere of RX gas+ammonia gas. The atmosphere in the furnace was strictly controlled. Specifically, unevenness of the temperature in the furnace and unevenness of the ammonia gas atmosphere were suppressed. Samples Nos. 3 and 4 described above correspond to Examples of the present invention. Sample Nos. 1 and 2 correspond to Comparative Examples.

<Contents of Experiments>

Experiment 1: Life Test

A life test apparatus was employed. As test conditions, test loads of Fr=18 kN and Fa=2 kN, lubricating oil of turbine oil 56, and a lubricating system of oil bath lubrication were applied. In the life test apparatus, two tapered roller bearings to be tested were arranged to support a support shaft at opposing ends. At a central portion of the support shaft in a direction of extension, that is, at a central portion between the two tapered roller bearings, a cylindrical roller bearing for applying a radial load to the tapered roller bearings via the support shaft was arranged. By applying a radial load to the load applying cylindrical roller bearing, the radial load was applied to the tapered roller bearings to be tested. An axial load was transmitted from one tapered roller bearing to the support shaft through a housing of the life test apparatus and applied to the other tapered roller bearing. Thus, the tapered roller bearing was subjected to the life test.

Experiment 2: Life Test with Unevenly Distributed Load Applied

The same test apparatus as in the life test in Experiment 1 was used. Although test conditions were basically the same as those in Experiment 1, an axial inclination of ⅔/1000 rad with respect to a central axis of the roller was applied and the test was conducted with an unevenly distributed load being applied.

Experiment 3: Rotational Torque Test

Sample Nos. 1 to 4 were subjected to a torque measurement test by using a vertical torque test rig. As test conditions, a test load of Fa=7000 N, lubricating oil of turbine oil 56, a lubrication system of oil bath lubrication, and the number of rotations of 5000 rpm were applied.

<Result>

Experiment 1: Life Test Sample No. 4 exhibited the best result and was considered to have a long life. While samples Nos. 2 and 3 were not comparable to Sample No. 4, they exhibited good results and were thus determined to be sufficiently durable for practical use. Sample No. 1 was shortest in life.

Experiment 2: Life Test with Unevenly Distributed Load Applied

Samples Nos. 4 and 3 exhibited the best result and were considered to have a long life. Sample No. 1 presented a relatively satisfactory result although it was not comparable to samples Nos. 4 and 3. Sample No. 2 presented a result worse than in Experiment 1, and is believed to have a short life due to the unevenly distributed load.

Experiment 3: Rotational Torque Test

Samples Nos. 1, 3, and 4 presented sufficiently small rotational torque and thus presented a good result. In contrast, sample No. 2 was larger in rotational torque than other samples.

From the above results, sample No. 4 generally presented a good result in any of the tests, and thus generally provided the best result. Sample No. 3 also presented a result better than that of samples Nos. 1 and 2.

Experimental Example 2

<Sample>

Sample No. 4 in Experimental Example 1 was used.

<Contents of Experiment>

Measurement of Nitrogen Concentration at Position of Depth of 0.05 mm from Surface:

A nitrogen concentration and a depth of a nitrogen enriched layer of sample No. 4 were measured. Measurement was conducted as below. At the first to third measurement points shown in FIG. 3, a tapered roller as the sample was cut in a direction perpendicular to the centerline to expose a cut surface. The cut surface was analyzed for a nitrogen concentration by EPMA at a plurality of measurement positions each located at a distance of 0.05 mm inward from the surface of the sample. Five measurement positions were determined in a cross-section at each of the first to third measurement points, and an average value of measurement data obtained at the five locations was adopted as a nitrogen concentration at each measurement point.

Measurement of Distance to Bottom of Nitrogen Enriched Layer:

In a cross-section of the tapered roller subjected to tempering treatment at 500° C.×1 h at the first to third measurement points, a hardness was measured at a plurality of measurement points aligned in the direction of depth at intervals of 0.5 mm. A region having a Vickers hardness of HV 450 or more was determined as a nitrogen enriched layer, and a depth of a position where the hardness attained to HV 450 was determined as the bottom of the nitrogen enriched layer.

<Result>

Measurement of Nitrogen Concentration at Position of Depth of 0.05 mm from Surface:

Nitrogen concentrations were 0.2 mass %, 0.25 mass %, and 0.3 mass % at the first, second, and third measurement points, respectively. The measurement points all presented measurement results falling within the scope of the present invention.

Measurement of Distance to Bottom of Nitrogen Enriched Layer:

Distances to the bottom of the nitrogen enriched layer at the first, second, and third measurement points were 0.3 mm, 0.35 mm, and 0.3 mm, respectively. The measurement points all presented measurement results falling within the scope of the present invention.

Experimental Example 3

<Sample in Example>

Figure 23:
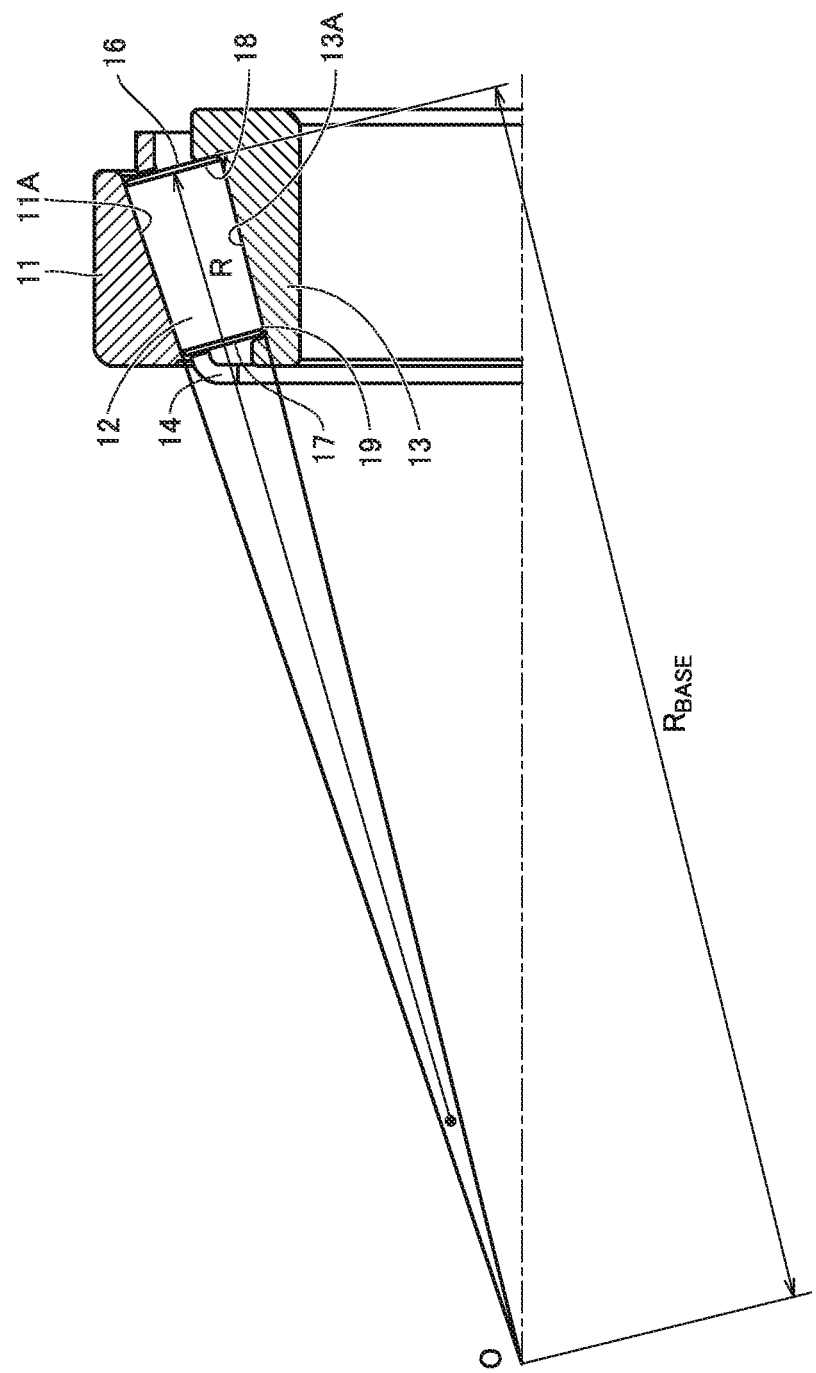
FIG. 23 is a cross-sectional view showing design specifications of the tapered roller bearing according to a second embodiment.

A tapered roller bearing (samples Nos. 5 to 8 in Table 1) in which radius of curvature R of the larger end face of the tapered roller was within a range of $R/R_{BASE}$ not smaller than 0.75 and not greater than 0.87, the larger flange surface of the inner ring had surface roughness Ra of 0.12 µm, the smaller flange surface was formed as a ground surface in parallel to the smaller end face of the tapered roller, and the first gap was within the dimension restricted range not greater than 0.4 mm shown in FIG. 23 was prepared. The bearing had an inner diameter of 40 mm and an outer diameter of 68 mm.

<Sample in Comparative Example>

A tapered roller bearing (samples Nos. 9 to 11 in Table 1) in which a value of $R/R_{BASE}$ was out of the scope of the present application, the smaller flange surface of the inner ring was inclined outward relative to the smaller end face of the tapered roller, and the first gap exceeded 0.4 mm was prepared. Each bearing had a dimension the same as in Example.

The tapered roller bearings in Example and Comparative Example were subjected to a seizure resistance test by using a rotary test rig. A running-in test was also conducted for the tapered roller bearings of samples Nos. 6 and 10. The number of samples in the running-in test was set to 66 for sample No. 6 and to 10 for sample No. 10. Conditions for the seizure resistance test included an applied load of 19.61 kN, the number of rotations of 1000 to 3500 rpm, and lubricating oil of turbine VG56 (an amount of oil feed of 40 milliliters/min. and a temperature of fed oil of 40° C.±3° C.).

Table 1 shows results of the test. Seizure in the seizure resistance test occurred between the larger flange surface of the inner ring and the larger end face of the tapered roller.

TABLE 1

| Sample NO. | Radius of Curvature $R/R_{BASE}$ | Surface Roughness Ra (µm) | Limit Number of Rotations Until Occurrence of Seizure in Seizure Resistance Test (rpm) | The Number of Rotations Until Settling in Running-in Test (Times) | |
|---|---|---|---|---|---|
| | | | | Average Value | Standard Deviation |
| Sample 5 | 0.75 | 0.12 | 2700 | — | — |
| Sample 6 | 0.80 | 0.12 | 3500 | 2.96 | 0.56 |
| Sample 7 | 0.85 | 0.12 | 3000 | — | — |
| Sample 8 | 0.87 | 0.12 | 2700 | — | — |
| Sample 9 | 0.70 | 0.12 | 2200 | — | — |
| Sample 10 | 0.94 | 0.12 | 2500 | 6.00 | 1.33 |
| Sample 11 | 0.94 | 0.25 | 2200 | — | — |

It can be seen that the tapered roller bearing in Example achieved the limit number of rotations not less than 2700 rpm until occurrence of seizure in the seizure resistance test, and was low in friction resistance between the larger flange surface of the inner ring and the larger end face of the tapered roller. The tapered roller bearing in Comparative Example achieved the limit number of rotations not more than 2500 rpm until occurrence of seizure, which may give rise to a problem under a normal condition of use of a differential gear or the like. Sample 11 large in surface roughness Ra of the larger flange surface exhibited the limit number of rotations until occurrence of seizure being smaller than sample No. 10 equal in radius of curvature R.

Regarding results of the running-in test, in Comparative Example, an average value of the number of rotations until the tapered roller was set in place was six, whereas in Example, the average value was 2.96 which was approximately half that in Comparative Example. It can be seen that Example was small also in standard deviation in variation in number of rotations and could be shorter in running-in period in a stable manner.

As set forth above, in the tapered roller bearing according to the present invention, radius of curvature R of the larger end face of the tapered roller had a value satisfying a range of $R/R_{BASE}$ not smaller than 0.75 and not greater than 0.87 and the smaller flange surface of the inner ring was formed as a surface in parallel to the smaller end face of the tapered roller. Therefore, torque loss and heat generation due to sliding friction between the larger flange surface of the inner ring and the larger end face of the tapered roller could be reduced to prevent seizure and a running-in period could be shorter to make a bearing attachment operation more efficient. Durability of a gear shaft support apparatus for automobiles can be improved.

In tapered roller bearing 10 according to the first embodiment, cage 14 includes smaller annular portion 106 continuous on the side of the smaller-diameter end face of tapered roller 12, larger annular portion 107 continuous on the side of the larger-diameter end face of tapered roller 12, and a plurality of posts 108 that couple the annular portions to each other. Pocket 109 is provided in such a trapezoidal shape that a portion accommodating a smaller diameter side of tapered roller 12 is defined as a smaller width side and a portion accommodating a larger diameter side thereof is defined as a larger width side. By providing a notch having a width in the post on the smaller width side of pocket 109 of cage 14 from a boundary between smaller annular portion 106 and the post toward larger annular portion 107, lubricating oil that flows from the inner diameter side of cage 14 toward the inner ring is quickly discharged from the notch toward the outer ring on the outer diameter side, and an edge of smaller annular portion 106 on a side of pocket 109 is in such a shape that a base portion on the smaller width side of pocket 109 extends to the post.

Some tapered roller bearings included in a portion where lubricating oil flows in from the outside are provided with a notch in a pocket of a cage so that lubricating oil that flows in as being divided into lubricating oil on the outer diameter side and lubricating oil on the inner diameter side of the cage passes through the notch and flow of lubricating oil inside the bearing is improved. It has been found, however, that, in a tapered roller bearing in which lubricating oil flows into the inside of the bearing as being divided into lubricating oil on the outer diameter side and lubricating oil on the inner diameter side of the cage, torque loss increases with increase in ratio of lubricating oil that flows from the inner diameter side of the cage toward the inner ring. The reason may be as set forth below.

Lubricating oil that flows from the outer diameter side of the cage toward the outer ring smoothly flows along the raceway surface thereof toward the larger diameter side of the tapered roller and flows out of the inside of the bearing because there is no obstacle in an inner-diameter surface of the outer ring. Lubricating oil that flows from the inner diameter side of the cage toward the inner ring, however, is blocked by a larger flange when it flows along the raceway surface thereof and passes toward the larger diameter side of the tapered roller because of the presence of the larger flange on an outer-diameter surface of the inner ring, and lubricating oil tends to stay in the inside of the bearing. Therefore, with increase in ratio of lubricating oil that flows from the inner-diameter side of the cage toward the inner ring, an amount of lubricating oil that stays in the inside of the bearing may increase and lubricating oil that stays may become flow resistance against rotation of the bearing, which may lead to increase in torque loss.

In tapered roller bearing 10 according to the first embodiment, a notch is provided in a post on the smaller-width side of the trapezoidal pocket of the cage so that lubricating oil that flows from the inner-diameter side of the cage toward the inner ring is quickly discharged from the notch toward the outer ring on the smaller-width side of the pocket which accommodates the smaller-diameter side of the tapered roller, an amount of lubricating oil that reaches the larger flange along the raceway surface of the inner ring is decreased, an amount of lubricating oil that stays in the inside of the bearing is decreased, and torque loss due to flow resistance of the lubricating oil can be reduced.

Second Embodiment

Referring to FIGS. 23 to 26, though a tapered roller bearing according to a second embodiment is basically similar in construction to tapered roller bearing 10 according to the first embodiment, ratio $R/R_{BASE}$ between radius of curvature R of larger end face 16 of tapered roller 12 to distance $R_{BASE}$ from the 0 point to larger flange surface 18 of inner ring 13 is not smaller than 0.75 and not greater than 0.87 and the smaller flange surface of inner ring 13 is finished to a ground surface in parallel to smaller end face 17 of tapered roller 12 disposed on raceway surface 13A.

As shown in FIG. 23, apexes of cone angles of tapered roller 12 and raceway surfaces 11A and 13A of outer ring 11 and inner ring 13 meet at one point O on the centerline of tapered roller bearing 10 and ratio $R/R_{BASE}$ between radius of curvature R of larger end face 16 of tapered roller 12 and distance $R_{BASE}$ from the 0 point to larger flange surface 18 of inner ring 13 is within a range not smaller than 0.75 and not greater than 0.87. Larger flange surface 18 is ground to have surface roughness Ra, for example, not greater than 0.12 μm.

The reason why ratio $R/R_{BASE}$ between radius of curvature R of the larger end face of the tapered roller and distance $R_{BASE}$ from the apex of the cone angle of the tapered roller to the larger flange surface of the inner ring is within a range not smaller than 0.75 and not greater than 0.87 is as set forth below.

Figure 29:
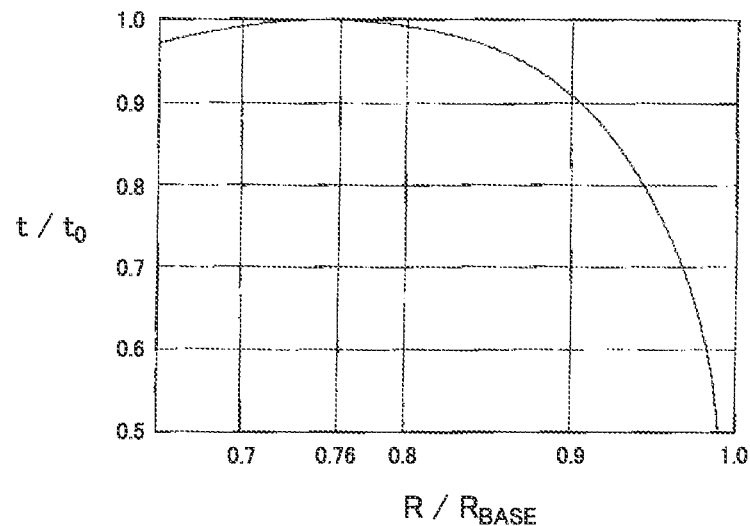
FIG. 29 shows a graph showing relation between a radius of curvature of a larger end face of the roller of the tapered roller bearing according to the second embodiment and a thickness of an oil film.

FIG. 29 shows a result of calculation based on the expression of Karna, of a thickness t of an oil film formed between the larger flange surface of the inner ring and the larger end face of the tapered roller. The ordinate represents a ratio $t/t_0$ to an oil film thickness $t_0$ when relation of $R/R_{BASE}=0.76$ is satisfied. Oil film thickness t is maximized when relation of $R/R_{BASE}=0.76$ is satisfied, and when $R/R_{BASE}$ exceeds 0.9, the oil film thickness abruptly decreases.

Figure 30:
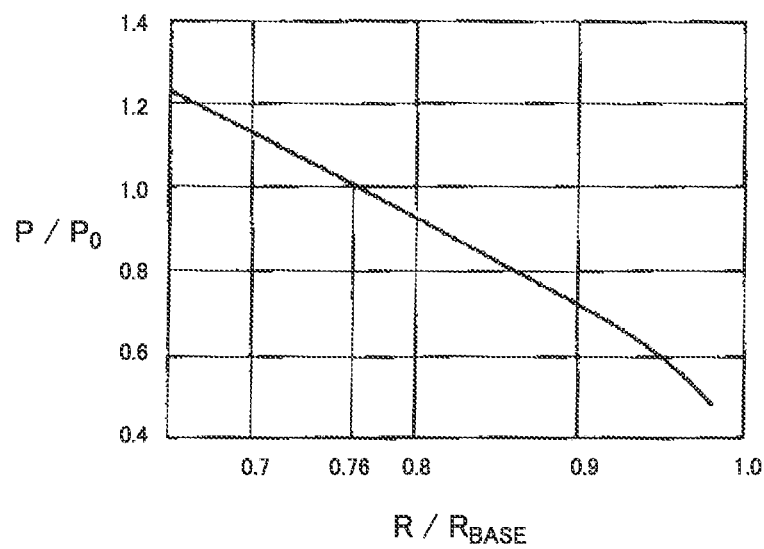
FIG. 30 shows a graph showing relation between a radius of curvature of the larger end face of the roller of the tapered roller bearing according to the second embodiment and maximum Hertz stress.

FIG. 30 shows a result of calculation of maximum Hertz stress p between the larger flange surface of the inner ring and the larger end face of the tapered roller. The ordinate represents a ratio $p/p_0$ to maximum Hertz stress $p_0$ when relation of $R/R_{BASE}=0.76$ is satisfied as in FIG. 29. Maximum Hertz stress p monotonously decreases with increase in $R/R_{BASE}$.

In order to reduce torque loss and heat generation due to sliding friction between the larger flange surface of the inner ring and the larger end face of the tapered roller, desirably, oil film thickness t is made larger and maximum Hertz stress p is lowered. The present inventors determined that a proper range of $R/R_{BASE}$ was not smaller than 0.75 and not greater than 0.87 based on a result of a seizure resistance test shown previously in Table 1 with reference to the results of calculation in FIGS. 29 and 30. For a conventional tapered roller bearing, a value of $R/R_{BASE}$ is designed within a range not smaller than 0.90 and not greater than 0.97.

The tapered roller bearing according to the second embodiment is different in that ratio $R_{process}/R$ between actual radius of curvature $R_{process}$ (see FIG. 26) and (reference) radius of curvature R (see FIG. 24) is specified as being not lower than 0.8 where $R_{process}$ represents an actual radius of curvature after working of the larger end face of the tapered roller.

Figure 24:
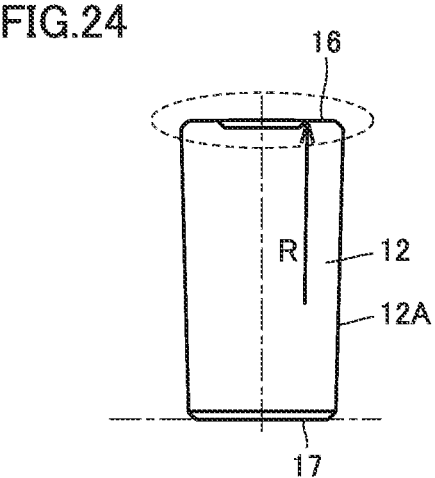
FIG. 24 is a cross-sectional view for illustrating a reference radius of curvature of the roller in the tapered roller bearing according to the second embodiment.
Figure 25:
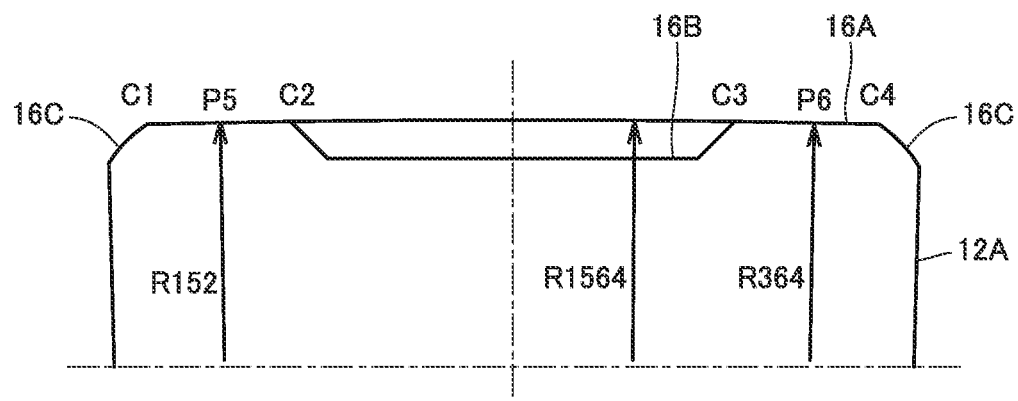
FIG. 25 is a partial cross-sectional view showing an area surrounded by a dotted line in FIG. 24.

FIGS. 24 and 25 are schematic cross-sectional views along an axis of rolling of the tapered roller obtained when ideal grinding is performed. When ideal grinding is performed, the larger end face of the obtained tapered roller defines a part of a spherical surface around apex O (see FIG. 8) of a cone angle of tapered roller 12. When ideal grinding as leaving a part of a projection 16A is performed as shown in FIGS. 24 and 25, larger end face 16 of roller 12 including an end face of projection 16A defines a part of one spherical surface around the apex of the cone angle of roller 12. In this case, an inner circumferential end of the projection in the radial direction around the axis of rolling (an axis of revolution) of roller 12 is connected to a recess with points C2 and C3 being interposed. An outer circumferential end of the projection is connected to a chamfered portion with points C1 and C4 being interposed. On an ideal larger end face, points C1 to C4 are arranged on one spherical surface as described above.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape. From a different point of view, a projection resulting from the punch of the forging apparatus is formed in an outer circumferential portion of a surface to be the larger end face of the formed product obtained by forging. The projection has, for example, an annular two-dimensional shape. At least a part of the projection of the formed product is removed by subsequently performed grinding.

Radius of curvature R of larger end face 16 of roller 12 refers to an R dimension when larger end face 16 of roller 12 shown in FIG. 24 is a set ideal spherical surface. Specifically, as shown in FIG. 25, with points at an end of larger end face 16 of roller 12 being defined as C1, C2, C3, and C4, with a point intermediate between points C1 and C2 being defined as P5, and with a point intermediate between points C3 and C4 being defined as P6, radius of curvature R152 that passes through points C1, P5, and C2, a radius of curvature R364 that passes through points C3, P6, and C4, and a radius of curvature R1564 that passes through points C1, P5, P6, and C4 define an ideal single arcuate curve which satisfies relation of R152=R364=R1564. Points C1 and C4 are points of connection between projection 16A and a chamfered portion 16C and points C2 and C3 are points of connection between projection 16A and recess 16B. The ideal single arcuate curve which satisfies relation of R=R152=R364=R1564 is called a reference radius of curvature. Reference radius of curvature R is different from actual radius of curvature $R_{process}$ measured as a radius of curvature of the larger end face of the tapered roller obtained by actual grinding as will be described later.

Figure 26:
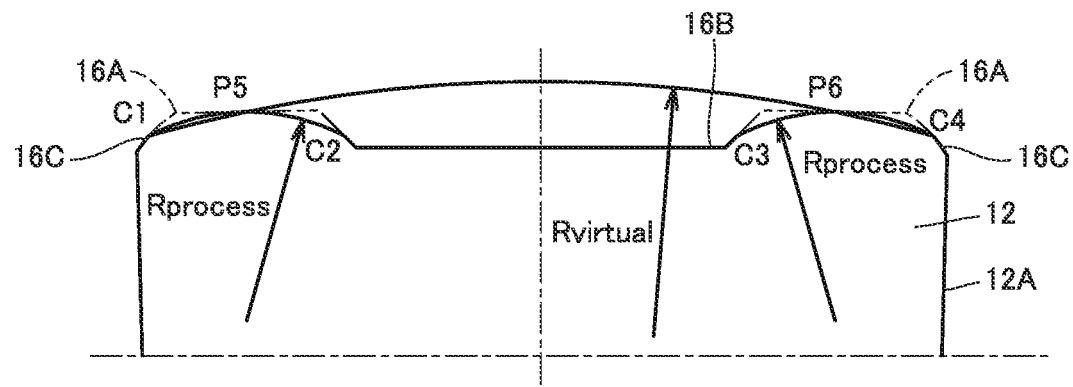
FIG. 26 is a cross-sectional view for illustrating an actual radius of curvature of the roller in the tapered roller bearing according to the second embodiment.

FIG. 26 is a schematic cross-sectional view along the axis of rolling of the tapered roller obtained by actual grinding. FIG. 26 shows the ideal larger end face shown in FIG. 25 with a dotted line. As shown in FIG. 26, the larger end face of a tapered roller actually obtained by grinding a formed product provided with the recess and the projection as above does not define a part of one spherical surface around an apex of a cone angle of the tapered roller. Points C1 to C4 on the projection of the actually obtained tapered roller sag as compared with the projection shown in FIG. 25. As compared with points C1 and C4 shown in FIG. 25, points C1 and C4 shown in FIG. 26 are arranged on an outer circumferential side in the radial direction with respect to the center of the axis of rolling and arranged on an inner side in a direction of extension of the axis of rolling (R152 on one side with respect to R1564 of the entire larger end face 16 being not identical but being small). As compared with points C2 and C3 shown in FIG. 25, points C2 and C3 shown in FIG. 26 are arranged on an inner circumferential side in the radial direction with respect to the center of the axis of rolling and arranged on the inner side in the direction of extension of the axis of rolling (R364 on one side with respect to R1564 of the entire larger end face 16 not being identical but being small). Intermediate points P5 and P6 shown in FIG. 26 are formed at positions substantially equal to intermediate points P5 and P6 shown, for example, in FIG. 25.

As shown in FIG. 26, in the larger end face actually formed by grinding, apex C1 and apex C2 are arranged on one spherical surface and apex C3 and apex C4 are arranged on another spherical surface. In general grinding, a radius of curvature of one circular arc defined by a part of the larger end face formed on one projection is substantially equal to a radius of curvature of a circular arc defined by a part of the larger end face formed on the other projection. R152 on one side after working of larger end face 16 of roller 12 shown in FIG. 26 is substantially equal to R364 on the other side. R152 and R364 on one side after working of larger end face 16 of roller 12 are called actual radius of curvature $R_{process}$. Actual radius of curvature $R_{process}$ is not greater than reference radius of curvature R.

The tapered roller of the tapered roller bearing according to the present embodiment has ratio $R_{process}/R$ of actual radius of curvature $R_{process}$ to radius of curvature R not lower than 0.8.

As shown in FIG. 26, in the larger end face actually formed by grinding, a radius of curvature $R_{virtual}$ of a virtual circular arc (which is referred to as a virtual radius of curvature below) that passes through apex C1, intermediate point P5, intermediate point P6, and apex C4 is not greater than reference radius of curvature R. The tapered roller of the tapered roller bearing according to the present embodiment has ratio $R_{process}/R_{virtual}$ of actual radius of curvature $R_{process}$ to virtual radius of curvature $R_{virtual}$ not lower than 0.8.

Actual radius of curvature $R_{process}$ and virtual radius of curvature $R_{virtual}$ of the tapered roller actually formed by grinding can be measured by any method, and can be measured, for example, by using a surface roughness measurement instrument (Surface Roughness Tester Surftest SV-100 manufactured by Mitutoyo Corporation). When the surface roughness measurement instrument is used, an axis of measurement is initially set along the radial direction around the axis of rolling and a surface profile of the larger end face is determined. Apexes C1 to C4 and intermediate points P5 and P6 are plotted on the obtained profile of the larger end face. Actual radius of curvature $R_{process}$ is calculated as a radius of curvature of a circular arc that passes through plotted apex C1, intermediate point P5, and apex C2. Virtual radius of curvature $R_{virtual}$ is calculated as a radius of curvature of a circular arc that passes through plotted apex C1, intermediate points P5 and P6, and apex C4.

Reference radius of curvature R is estimated based on each dimension of a tapered roller obtained by actual grinding, for example, based on industrial standards such as the JIS.

Preferably, the larger end face has surface roughness Ra not greater than 0.10 μm. Preferably, the larger flange surface has surface roughness Ra not greater than 0.063 μm.

Figure 27:
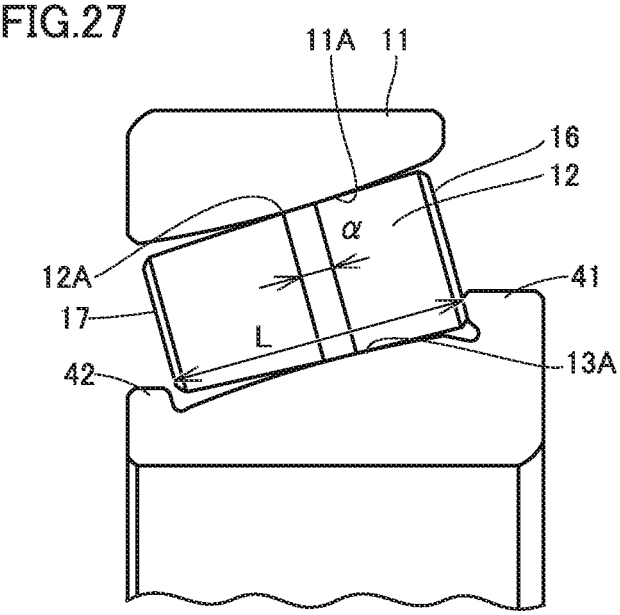
FIG. 27 is a cross-sectional view showing an exemplary method of changing a position of abutment between a raceway surface and a rolling surface in the tapered roller bearing according to the second embodiment.
Figure 28:
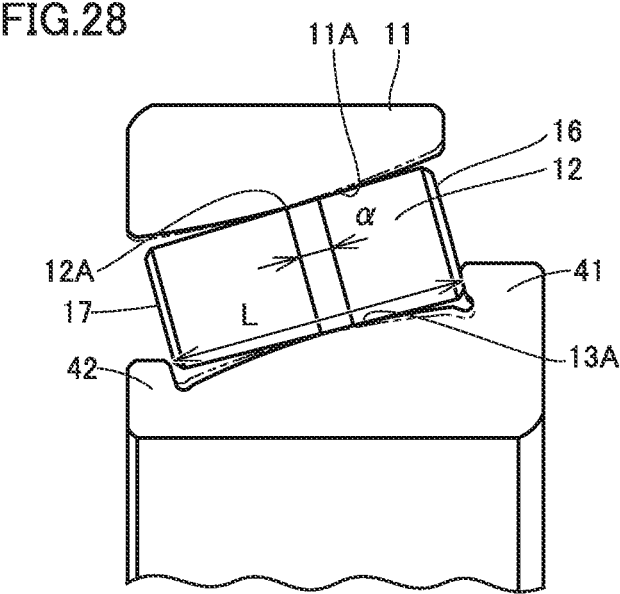
FIG. 28 is a cross-sectional view showing another exemplary method of changing a position of abutment between a raceway surface and a rolling surface in the tapered roller bearing according to the second embodiment.

Preferably, as shown in FIGS. 27 and 28, ratio α/L of amount α of displacement from a midpoint of the rolling surface in a direction of extension of the axis of rolling, of a position of abutment between raceway surfaces 11A and 13A of the inner ring and outer ring 11 and the rolling surface to width L of the roller rolling surface in the direction of extension is not lower than 0% and lower than 20%. The position of abutment when ratio α/L exceeds 0% is located at a central position or located closer to the larger end face than the central position in the rolling surface in the direction of extension of the axis of rolling.

A construction in which ratio α/L exceeds 0% can be realized by relatively displacing a position of an apex of each of a crowning profile formed in the roller rolling surface and a crowning profile formed in raceway surfaces 11A and 13A of the inner ring and outer ring 11 as shown in FIG. 27.

Alternatively, the construction in which ratio α/L exceeds 0% can be realized by relatively varying an angle formed by raceway surface 13A of the inner ring with respect to the axial direction of the inner ring and an angle formed by raceway surface 11A of outer ring 11 with respect to the axial direction of outer ring 11 as shown in FIG. 28. Specifically, the construction in which ratio α/L exceeds 0% can be realized by at least any method of increasing an angle formed by raceway surface 13A of the inner ring with respect to the axial direction of the inner ring and decreasing an angle formed by raceway surface 11A of outer ring 11 with respect to the axial direction of outer ring 11 as compared with an example in which amount α of displacement of the position of abutment shown with a dotted line in FIG. 28 is zero.

<Function and Effect>

Since the tapered roller bearing according to the present second embodiment is basically similar in construction to tapered roller bearing 10 according to the first embodiment, it can achieve effects similar to those of tapered roller bearing 10 according to the first embodiment.

The tapered roller bearing according to the present second embodiment has ratio $R_{process}/R$ of actual radius of curvature $R_{process}$ to reference radius of curvature R not lower than 0.8. The present inventors confirmed that the tapered roller bearing having ratio $R_{process}/R$ not lower than 0.8 could achieve improved seizure resistance as compared with the tapered roller bearing having $R_{process}/R$ lower than 0.8.

The tapered roller bearing can bear a certain axial load as the larger end face of the roller and the larger flange surface of the inner ring are in sliding contact. Owing to sliding contact, when lubrication between the larger end face and the larger flange surface is insufficient, a contact surface pressure between the larger end face and the larger flange surface increases and metal-to-metal contact occurs.

When the rolling surface of the tapered roller is crowned as in the tapered roller bearing, increase in contact surface pressure between the roller rolling surface and raceway surfaces 11A and 13A of the inner and outer rings can be suppressed whereas skew occurs. When skew occurs, tangential force applied between the larger end face and the larger flange surface increases and friction torque increases. When a skew angle increases, the larger end face and the larger flange surface are in what is called edge contact with each other. Then, metal-to-metal contact occurs between these surfaces.

Therefore, in order to further improve seizure resistance of the tapered roller bearing, increase in rotational torque due to friction at a point of contact between the larger end face of the roller and the larger flange surface of the inner ring should be suppressed and heat generation should be reduced.

In order to suppress metal-to-metal contact between the larger end face of the roller and the larger flange surface of the inner ring and to reduce heat generation, a sufficient thickness of an oil film between the surfaces should be secured.

As described above, a value of ratio $R/R_{BASE}$ of reference radius of curvature R of the larger end face of the tapered roller to distance $R_{BASE}$ from the apex of the cone angle of the tapered roller to the larger flange surface of the inner ring is not smaller than 0.75 and not greater than 0.87. Therefore, oil film thickness t can be large and maximum Hertz stress p can be small based on FIGS. 29 and 30, and torque loss and heat generation due to sliding friction between the larger end face and the larger flange surface can be reduced.

Since the tapered roller bearing according to the second embodiment has ratio $R_{process}/R$ not lower than 0.8, a contact surface pressure between the larger end face and the larger flange surface can be lowered and increase in skew angle can be suppressed as compared with the tapered roller bearing of which ratio $R_{process}/R$ is lower than 0.8. Consequently, increase in contact surface pressure between the larger end face and the larger flange surface can be suppressed and a sufficient oil film thickness between the surfaces can be secured. This effect was confirmed by a result of calculation below.

Table 2 shows a result of calculation of each ratio of a contact surface pressure p between the larger end face and the larger flange surface, a skew angle θ, and an oil film parameter Λ with ratio $R_{process}/R$ being varied to a contact surface pressure p0, a skew angle θ0, and an oil film parameter Λ0 when ratio $R_{process}/R$ is 1.

TABLE 2

| Ratio$_{proses}$/R of Radius of Curvature | 0.5 | 0.7 | 0.8 | 0.9 | 1.0 |
|---|---|---|---|---|---|
| Ratio p/p0 of Contact Surface Pressure | 2.2 | 1.6 | 1.4 | 1.2 | 1 |
| Ratio Φ/Φ0 of Skew Angle | 5 | 3 | 1.5 | 1.2 | 1 |
| Ratio Λ/Λ0 of Oil Film Parameter | 0.3 | 0.5 | 0.8 | 0.9 | 1 |

As shown in Table 2, when ratio $R_{process}/R$ is not higher than 0.7, ratio p/p0 of the contact surface pressure between the larger end face and the larger flange surface is not lower than 1.6, ratio θ/θ0 of the skew angle is not lower than 3, and ratio Λ/Λ0 of the oil film parameter is not higher than 0.5. When such a tapered roller bearing is used, for example, in an environment not good in lubrication where oil film parameter Λ is smaller than 2, oil film parameter Λ is smaller than 1 and a state of contact between the larger end face and the larger flange surface is in a boundary lubrication region where metal-to-metal contact occurs. In contrast, when ratio $R_{process}/R$ is not lower than 0.8, ratio p/p0 of the contact surface pressure is not higher than 1.4, ratio θ/θ0 of the skew angle is not higher than 1.5, and ratio Λ/Λ0 of the oil film parameter is not lower than 0.8. Therefore, it was confirmed based on the result of calculation that the tapered roller bearing having ratio $R_{process}/R$ not lower than 0.8 could secure an oil film thickness between the larger end face and the larger flange surface as compared with the tapered roller bearing having ratio $R_{process}/R$ lower than 0.8.

Preferably, in the tapered roller bearing according to the second embodiment, the larger end face has surface roughness Ra not greater than 0.10 μm and the larger flange surface has surface roughness Ra not greater than 0.063 μm. Thus, a more sufficient oil film thickness can be secured between the larger end face of the roller and the larger flange surface of the inner ring. Specifically, when the larger end face and the larger flange surface each have surface roughness Ra within the numeric range, oil film parameter Λ (=h/σ) defined as "a ratio between an oil film thickness h and composite roughness σ of root mean roughness of a larger end face and a larger flange surface found based on elastohydrodynamic lubrication theory" can be enhanced as compared with an example in which the surface roughness is out of the numeric range. Therefore, a sufficient oil film thickness can be secured between the larger end face and the larger flange surface.

Preferably, in the tapered roller bearing according to the second embodiment, ratio α/L of amount α of displacement from the midpoint of the rolling surface in the direction of extension of the axis of rolling, of the position of abutment between raceway surfaces 11A and 13A of the inner ring and outer ring 11 and the rolling surface to width L of the roller rolling surface in the direction of extension is not lower than 0% and lower than 20%, and the position of abutment is located at a central position or located closer to the larger end face than the central position in the rolling surface in the direction of extension of the axis of rolling. The present inventors confirmed that, by setting ratio α/L to be not lower than 0% and lower than 20% and setting the position of abutment when ratio α/L exceeded 0% to be located at the central position or closer to the larger end face than the central position in the rolling surface in the direction of extension of the axis of rolling, a skew angle could be decreased and increase in rotational torque could be suppressed as compared with an example in which the position of abutment when ratio α/L exceeded 0% was located at the central position or closer to the smaller end face than the central position in the rolling surface in the direction of extension of the axis of rolling.

Table 3 shows a result of calculation of ratios of skew angle θ and rotational torque M with displacement amount α being varied to skew angle θ0 and rotational torque M0 when displacement amount α is 0, that is, the position of abutment between raceway surfaces 11A and 13A of the inner ring and outer ring 11 and the rolling surface is located at the midpoint of the rolling surface in the direction of extension of the axis of rolling. Table 3 shows with a negative value, a displacement amount when the position of abutment is displaced toward the smaller end face relative to the midpoint. A sample of which ratio of rotational torque M/M0 was not higher than 1.1 was evaluated as good (○ in Table 3) and a sample of which ratio of rotational torque M/M0 exceeded 1.1 was evaluated as not good (x in Table 3).

TABLE 3

|  | Displacement Amount α (%) | | | | | | |
| --- | --- | --- | --- | --- | --- | --- | --- |
|  | −10 | −5 | 0 | 5 | 10 | 15 | 20 |
| Ratio Φ/Φ0 of Skew Angle | 2 | 1.5 | 1 | 0.75 | 0.5 | 0.4 | 0.3 |
| Ratio M/M0 of Rotational Torque | 1.2 | 1.1 | 1 | 1.03 | 1.05 | 1.1 | 1.2 |
| Determination | X | ○ | ○ | ○ | ○ | ○ | X |

As shown in Table 3, when the position of abutment is relatively greatly displaced toward the smaller end face relative to the midpoint, that is, displacement amount α is less than −5%, ratio θ/θ0 of the skew angle is as high as two or more and slight increase in displacement amount results in significant increase in rotational torque.

In contrast, when the position of abutment is displaced relatively slightly toward the smaller end face relative to the midpoint, that is, displacement amount α is not lower than −5% and lower than 0%, ratio θ/θ0 of the skew angle is lower and a rate of increase in rotational torque with increase in displacement amount is lower than in an example where displacement amount α is smaller than −5%.

When displacement amount α is not lower than 0% and not higher than 20%, ratio θ/θ0 of the skew angle is not higher than 1 and slight increase in displacement amount does not result in significant increase in rotational torque.

Though not shown in Table 3, when displacement amount α exceeds 20%, rotational torque is unfavorably high to such an extent as causing other defects such as peeling. Therefore, it was confirmed based on the result of calculation that a skew angle could be decreased by setting ratio α/L to be not lower than 0% and lower than 20% and setting the position of abutment when ratio α/L exceeded 0% to the central position or a position closer to the larger end face than the central position in the rolling surface in the direction of extension of the axis of rolling.

Third Embodiment

Figure 31:
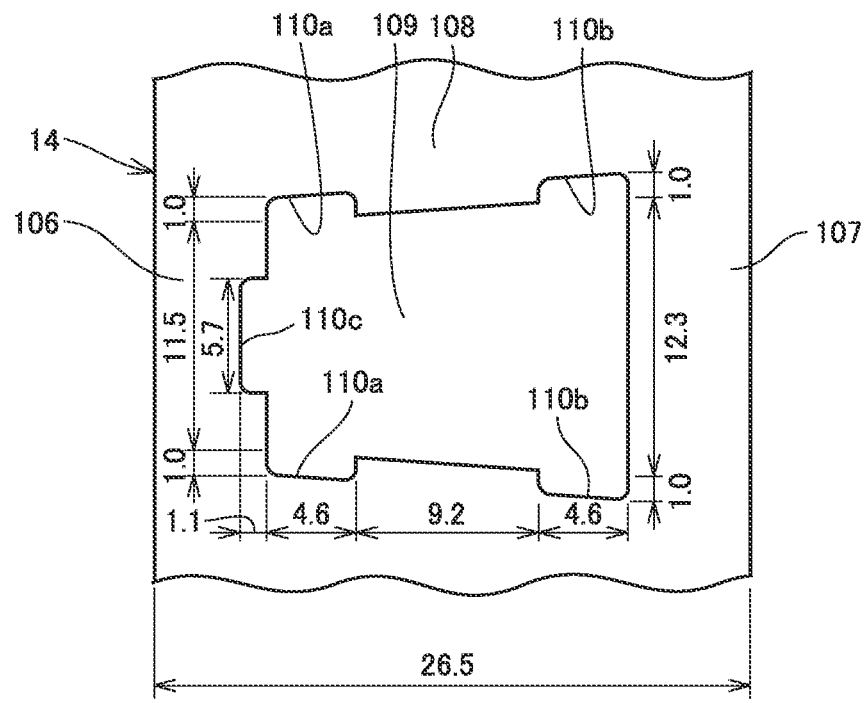
FIG. 31 is a developed plan view of an exemplary cage different from that in FIG. 12, of the tapered roller bearing in the present embodiment.

Exemplary cage 14 different from that in FIG. 12, of tapered roller bearing 10 in the present embodiment will be described below with reference to FIG. 31. Though the cage is basically similar in construction to cage 14 in FIG. 12, it is different in notch in cage 14. As shown in FIG. 31, smaller annular portion 106 on the smaller width side of pocket 109 is also provided with a notch 110c, and a total area of three notches 110a and 110c on the smaller width side is greater than a total area of two notches 110b on the larger width side. Notch 110c has a depth of 1.0 mm and a width of 5.7 mm.

Figure 32:
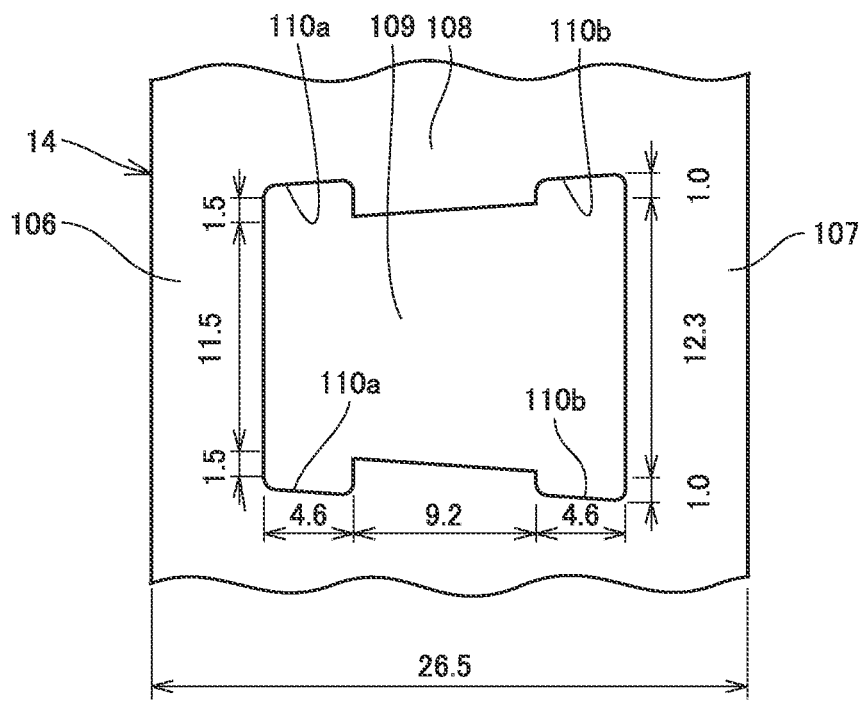
FIG. 32 is a developed plan view of a modification to the cage of the tapered roller bearing in the present embodiment.

In a modification shown in FIG. 32, each notch 110a in post 108 on the smaller width side has a depth of 1.5 mm which is greater than that of notch 110b in post 108 on the larger width side, and a total area of notches 110a on the smaller width side is greater than a total area of notches 110b on the larger width side.

Figure 35:
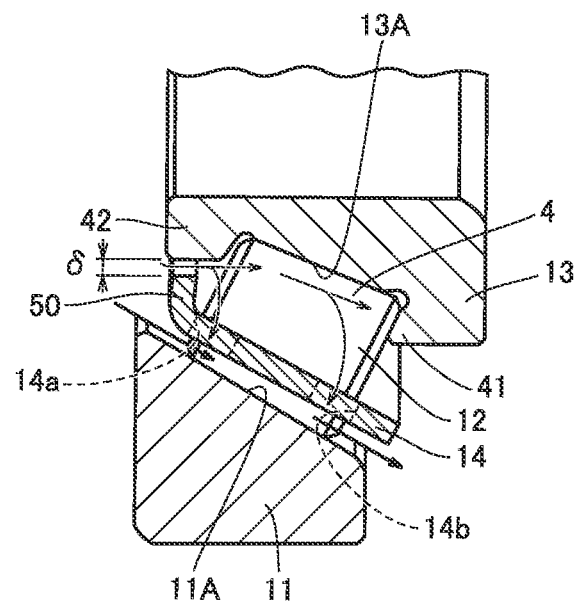
FIG. 35 is a cross-sectional view showing a flow of lubricating oil into the inside of the tapered roller bearing in FIG. 33.

On an axially outer side of smaller annular portion 106 of cage 14, as shown in FIG. 1, a radially inwardly extending flange 50 opposed to an outer diameter surface of smaller flange 42 of inner ring 13 is provided, and as shown in FIG. 35 later, a gap δ between an inner diameter surface of flange 50 of smaller annular portion 106 and the outer diameter surface of smaller flange 42 of inner ring 13 that are opposed to each other is set to be not greater than 2.0% of a dimension of an outer diameter of smaller flange 42.

Figure 33:
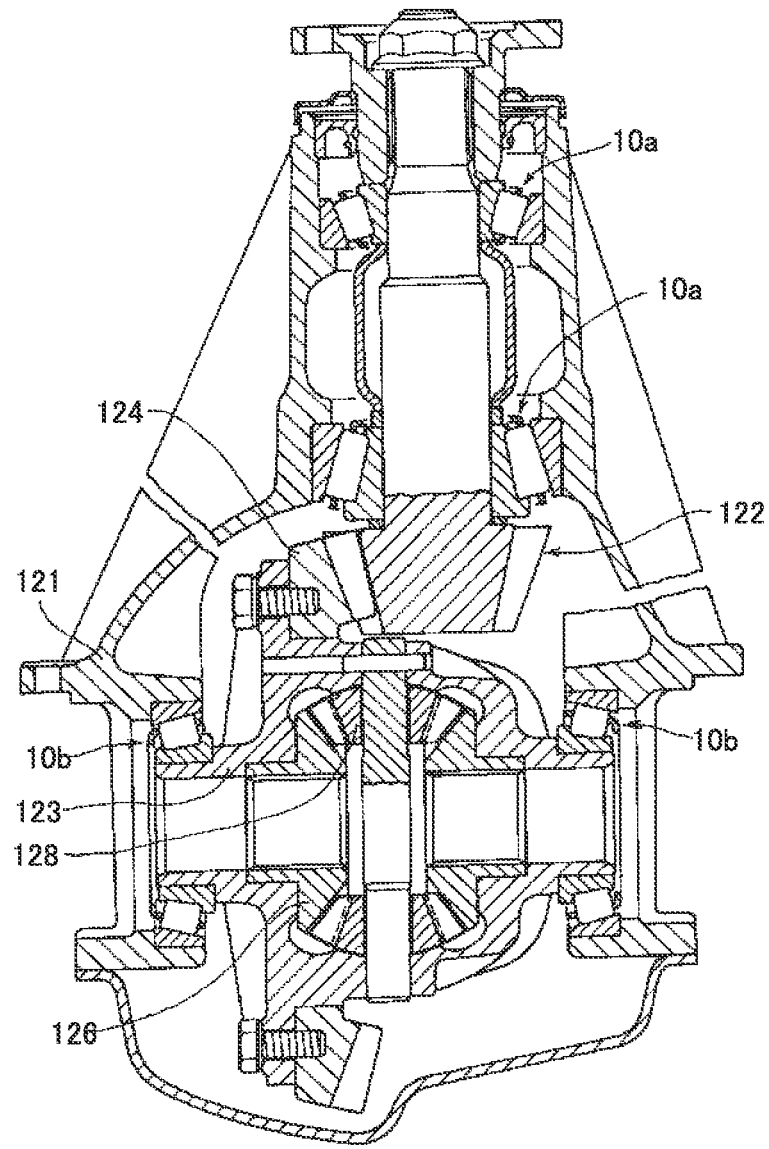
FIG. 33 is a vertical cross-sectional view showing a differential gear including the tapered roller bearing according to the present embodiment.
Figure 34:
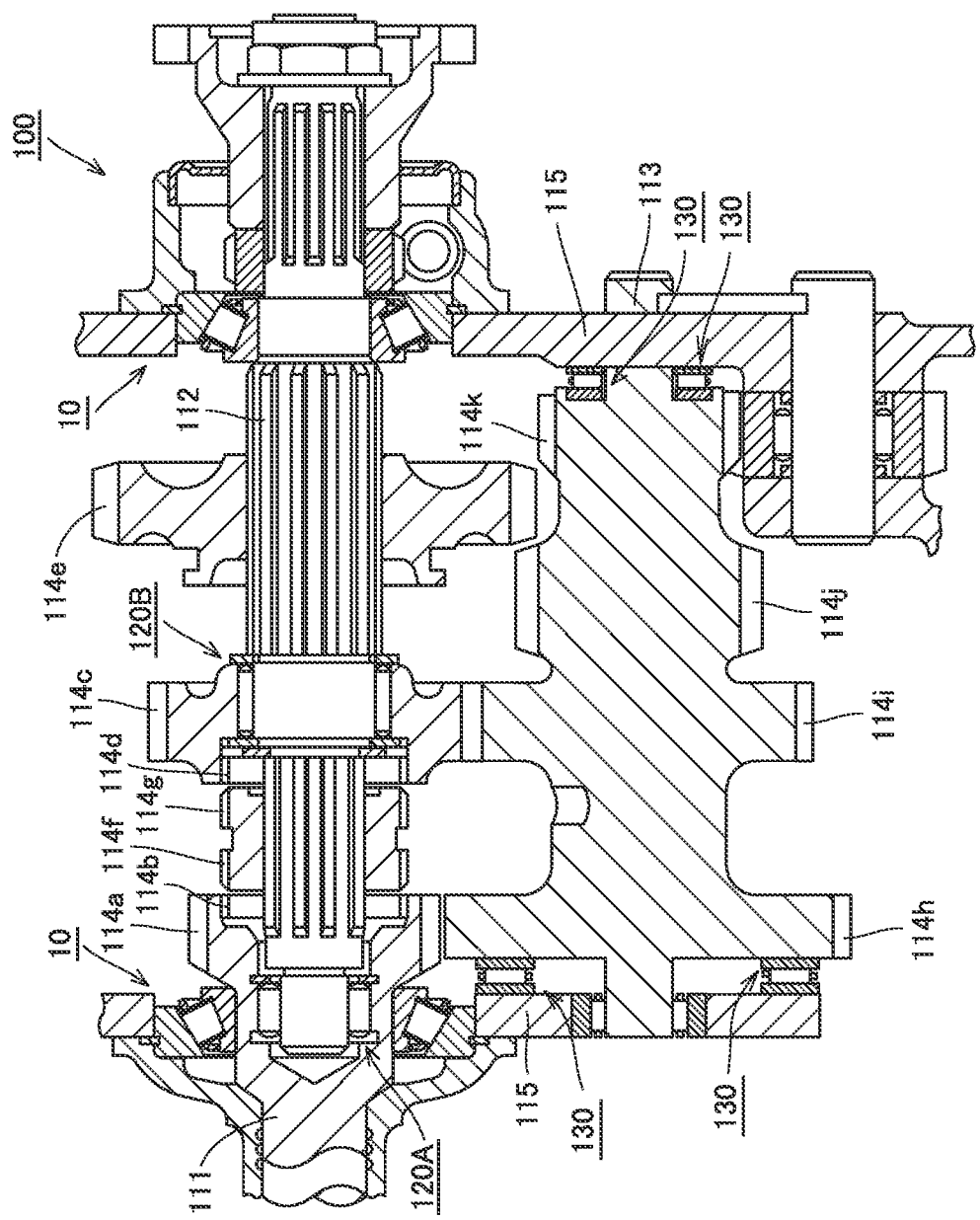
FIG. 34 is a vertical cross-sectional view showing a transmission including the tapered roller bearing according to the present embodiment.

An exemplary application of tapered roller bearing 10 in the present embodiment above to a differential gear and a transmission for automobiles is finally shown with reference to FIGS. 33 and 34. FIG. 33 shows a differential gear for automobiles including tapered roller bearing 10 described above. The differential gear is such that a drive pinion 122 coupled to a propeller shaft (not shown) and inserted through a differential case 121 is meshed with a ring gear 124 attached to a differential gear case 123 and a pinion gear 125 attached inside differential gear case 123 is meshed with a side gear 126 coupled to a drive shaft (not shown) inserted through differential gear case 123 from right and left sides so that driving force from an engine is transmitted from the propeller shaft to the left and right drive shafts. In this differential gear, drive pinion 122 serving as a power transmission shaft and differential gear case 123 are supported by a pair of tapered roller bearings 10a and a pair of tapered roller bearings 10b, respectively.

When tapered roller bearings 10a and 10b are rotated at a high speed and a lower portion thereof is immersed in an oil bath, as shown with an arrow in FIG. 35, lubricating oil in the oil bath flows from the smaller diameter side of roller 12 into the bearing as being divided into lubricating oil on the outer diameter side of cage 14 and lubricating oil on the inner diameter side thereof, and lubricating oil that has flowed from the outer diameter side of cage 14 into outer ring 11 passes along raceway surface 11A of outer ring 11 toward the large diameter side of roller 12 and flows out of the inside of the bearing. Lubricating oil that flows from the inner diameter side of cage 14 toward inner ring 13 is much smaller in amount than lubricating oil that flows from the outer diameter side of cage 14 because narrow gap δ is set between flange 50 of smaller annular portion 106 of cage 14 and smaller flange 42 of inner ring 13. Furthermore, most of lubricating oil that flows through gap δ passes through notch 110a provided in post 108 on the smaller width side of pocket 109 and moves toward the outer diameter side of cage 14. Therefore, an amount of lubricating oil which directly reaches larger flange 41 along raceway surface 13A of inner ring 13 is very small and an amount of lubricating oil that stays inside the bearing can be reduced.

In the tapered roller bearing according to each example of the present embodiment, the smaller annular portion on the smaller width side of the trapezoidal pocket is also provided with a notch so that lubricating oil that flows from the inner diameter side of the cage toward the inner ring can escape to the outer ring also through the notch in the smaller annular portion. An amount of lubricating oil that reaches the larger flange along the raceway surface of the inner ring can be reduced and torque loss due to flow resistance of lubricating oil can further be reduced.

By providing a notch at least in a post on the larger width side of the trapezoidal pocket, the tapered roller can be in slide contact with the post in a balanced manner.

By setting a total area of notches provided on the smaller width side of the trapezoidal pocket to be greater than a total area of notches provided on the larger width side of the trapezoidal pocket as well, an amount of lubricating oil that reaches the larger flange along the raceway surface of the inner ring can be decreased and torque loss due to flow resistance of lubricating oil can further be reduced. Since lubricating oil that flows in is discharged through the notch on the smaller width side toward the outer ring on the larger diameter side in an amount greater than an amount through the notch on the larger width side, torque loss due to flow resistance of lubricating oil can further be reduced.

By providing on the axially outer side of the smaller annular portion of the cage, a radially inward flange opposed to the outer diameter surface of the smaller flange of the inner ring and setting a gap between the inner diameter surface of the flange of the smaller annular portion and the outer diameter surface of the smaller flange of the inner ring which are opposed to each other to be not higher than 2.0% of the dimension of the outer diameter of the smaller flange of the inner ring, an amount of lubricating oil that flows from the inner diameter side of the cage toward the inner ring can be reduced and torque loss due to flow resistance of lubricating oil can further be reduced.

Fourth Embodiment

Though a tapered roller bearing according to a fourth embodiment is basically similar in construction to tapered roller bearing 10 according to the first embodiment, it is different in that a window angle θ of a post surface 14d shown in FIG. 6 is specified as being not smaller than 46 degrees and not greater than 65 degrees. Post surface 14d is a surface of post 108 which faces pocket 109 in a portion where no notch is provided.

The reason why a lower limit window angle θmin was set to 46 degrees or greater is to secure a good state of contact with a roller, and when the window angle is smaller than 46 degrees, a state of contact with the roller becomes poor. When the window angle is equal to or greater than 46 degrees, strength of the cage is secured, and then relation of γ>0.90 is satisfied and a good state of contact can be secured. The reason why an upper limit window angle θmax was set to 65 degrees or smaller is because a window angle greater than that leads to greater force of pressing in a direction of radius and even a self-lubricating resin material may not achieve smooth rotation. The window angle in a typical tapered roller bearing with a cage in which the cage is distant from an outer ring is at most approximately 50 degrees.

TABLE 4

| Bearing | Roller Coefficient | Lifetime | Remarks |
| --- | --- | --- | --- |
| Sample 12 | 0.96 | 40.2 hours | Stopped due to increase in torque caused by wear of cage |
| Sample 13 | 0.96 | 200 hours or longer | Terminated without abnormal condition |
| Sample 14 | 0.86 | 16.4 hours | Flaking of inner ring |

Table 4 shows a result of the life test of the bearing. In Table 4, "Sample No. 14" in the field of "bearing" represents a typical and conventional tapered roller bearing in which the cage and the outer ring are distant from each other, "Sample No. 12" represents a tapered roller bearing different only in roller coefficient γ exceeding 0.90 from the conventional product among the tapered roller bearings according to the present invention, and "Sample No. 13" represents a tapered roller bearing according to the present invention having roller coefficient γ exceeding 0.90 and a window angle within a range not smaller than 46 degrees and not greater than 65 degrees. The test was conducted under conditions of severe lubrication and application of an excessive load. As is clear from Table 4, "Sample No. 12" was at least twice as long in lifetime as "Sample No. 14." Though the bearing of "Sample No. 13" had a roller coefficient of 0.96 as large as that of "Sample No. 12," it was longer in lifetime at least approximately five times than "Sample No. 12." "Sample No. 14," "Sample No. 12," and "Sample No. 13" had a dimension of φ45×φ81×16 (unit of mm), included 24 rollers ("Sample No. 14") and 27 rollers ("Sample No. 12" and "Sample No. 13"), and had oil film parameter Λ=0.2.

An exemplary application of tapered roller bearing 10 according to the present embodiment will be described below. Tapered roller bearing 10 described above is suitable, for example, for a differential gear or a transmission of an automobile. Tapered roller bearing 10 is suitably used as a tapered roller bearing for an automobile. Tapered roller bearing 10 in the present embodiment may be incorporated for supporting a gear shaft of a powertrain such as a transmission. Referring to FIG. 34, a manual transmission 100 is a constantly meshing manual transmission, and includes an input shaft 111, an output shaft 112, a countershaft 113, gears 114a to 114k, and a housing 115.

Input shaft 111 is rotatably supported by tapered roller bearing 10 with respect to housing 115. Gear 114a is formed around an outer circumference of input shaft 111 and gear 114b is formed around an inner circumference thereof.

Output shaft 112 is supported by tapered roller bearing 10 on one side (a right side in the figure) rotatably with respect to housing 115 and supported by a rolling bearing 120A on the other side (a left side in the figure) rotatably with respect to input shaft 111. Gears 114c to 114g are attached to output shaft 112.

Gears 114c and 114d are formed around outer and inner circumferences, respectively, of the same member. The member on which gears 114c and 114d are formed is rotatably supported by a rolling bearing 120B with respect to output shaft 112. Gear 114e is attached to output shaft 112 so as to rotate together with output shaft 112 and be slidable along the axis of output shaft 112.

Gears 114f and 114g are formed around an outer circumference of the same member. The member on which gears 114f and 114g are formed is attached to output shaft 112 so as to rotate together with output shaft 112 and be slidable along the axis of output shaft 112. When the member on which gear 114f and gear 114g are formed slides to the left in the figure, gear 114f can mesh with gear 114b, and when the member slides to the right in the figure, gear 114g can mesh with gear 114d.

Countershaft 113 have gears 114h to 114k formed. Two thrust needle roller bearings are arranged between countershaft 113 and housing 115, and a load applied in the axial direction of countershaft 113 (a thrust load) is supported thereby. Gear 114h is constantly in mesh with gear 114a, and gear 114i is constantly in mesh with gear 114c. Gear 114j can mesh with gear 114e when gear 114e slides to the left in the figure. Gear 114k can mesh with gear 114e when gear 114e slides to the right in the figure.

A shift operation of manual transmission 100 will now be described. In manual transmission 100, rotation of input shaft 111 is transmitted to countershaft 113 by meshing of gear 114a formed on input shaft 111 and gear 114h formed on countershaft 113. Rotation of countershaft 113 is transmitted to output shaft 112 by meshing of gears 114i to 114k formed on countershaft 113 and gears 114c and 114e attached to output shaft 112. Thus, rotation of input shaft 111 is transmitted to output shaft 112.

When rotation of input shaft 111 is transmitted to output shaft 112, a rotation speed of output shaft 112 can be changed stepwise relative to a rotation speed of input shaft 111 by changing a gear meshed between input shaft 111 and countershaft 113 and a gear meshed between countershaft 113 and output shaft 112. Rotation of input shaft 111 can also directly be transmitted to output shaft 112 by directly meshing gear 114b of input shaft 111 with gear 114f of output shaft 112 without countershaft 113 being interposed.

The shift operation of manual transmission 100 will more specifically be described below. When gear 114f does not mesh with gear 114b, gear 114g does not mesh with gear 114d, and gear 114e meshes with gear 114j, driving force of input shaft 111 is transmitted to output shaft 112 via gear 114a, gear 114h, gear 114j, and gear 114e. This is referred to, for example, as a first speed.

When gear 114g meshes with gear 114d and gear 114e does not mesh with gear 114j, driving force of input shaft 111 is transmitted to output shaft 112 via gear 114a, gear 114h, gear 114i, gear 114c, gear 114d, and gear 114g. This is referred to, for example, as a second speed.

When gear 114f meshes with gear 114b and gear 114e does not mesh with gear 114j, input shaft 111 is directly coupled to output shaft 112 by meshing of gear 114b and gear 114f, and driving force of input shaft 111 is directly transmitted to output shaft 112. This is referred to, for example, as a third speed.

As described above, manual transmission 100 includes tapered roller bearing 10 for rotatably supporting input shaft 111 and output shaft 112 as rotary members with respect to housing 115 arranged adjacent thereto. Thus, tapered roller bearing 10 according to the embodiment can be used in manual transmission 100. Tapered roller bearing 10 with less torque loss and improved lifetime is suitable for use in manual transmission 100 in which a high contact pressure is applied between a rolling element and a raceway member.

In transmissions, differential gears, or the like which are powertrains for automobiles, not only lubricating oil low in viscosity is employed but also an amount of oil tends to be reduced for enhanced fuel economy, and formation of a sufficient oil film in a tapered roller bearing may be less likely. Therefore, tapered roller bearings for automobiles are required to achieve improved seizure resistance and longer life. Thus, the requirement can be satisfied by incorporating tapered roller bearing 10 achieving improved seizure resistance and longer life into a transmission or a differential gear.

Example 1

In Example, a tapered roller bearing (Example A) including the cage shown in FIG. 12 and a tapered roller bearing (Example B) including the cage shown in FIG. 31 were prepared. In Comparative Example, a tapered roller bearing (Comparative Example A) including a cage without a notch in a pocket, a tapered roller bearing (Comparative Example B) provided with a notch in a central portion of a post between pockets of the cage, and a tapered roller bearing (Comparative Example C) provided with a notch in a smaller annular portion and a larger annular portion at axial opposing ends of a pocket of the cage were prepared. Each tapered roller bearing had a dimension of an outer diameter of 100 mm, an inner diameter of 45 mm, and a width of 27.25 mm and the tapered roller bearings were identical to one another except for the notch in the pocket.

The tapered roller bearings in Examples and Comparative Examples were subjected to a torque measurement test by using a vertical torque test rig. Test conditions are as below.

Axial load: 300 kgf
Rotation speed: 300 to 2000 rpm (100 rpm pitch)
Lubrication condition: lubrication by oil bath (lubricating oil: 75 W-90)

Figure 36:
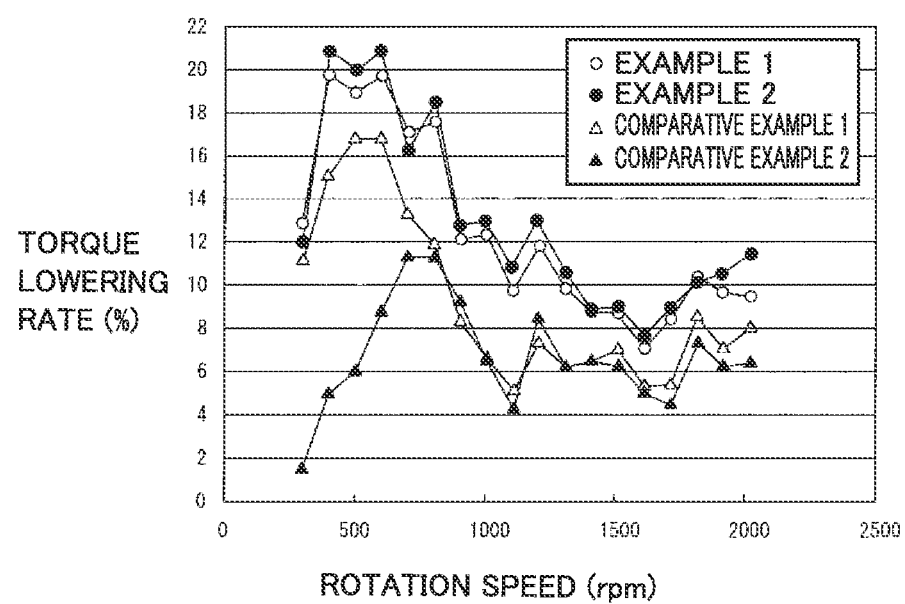
FIG. 36 is a graph showing a result of a torque measurement test.

FIG. 36 shows a result of the torque measurement test. The ordinate in the graph in FIG. 36 represents a rate of lowering in torque with respect to torque in Comparative Example A including the cage without a notch in the pocket. Though a torque lowering effect was found in Comparative Example B provided with a notch in the central portion of the post of the pocket and also in Comparative Example C provided with a notch in the smaller annular portion and the larger annular portion of the pocket, Example A provided with a notch in the post on the smaller width side of the pocket was found to achieve a torque lowering effect higher than in Comparative Examples, and Example B provided with a notch also in the smaller annular portion on the smaller width side and being greater in total area of notches on the smaller width side than on the larger width side was found to achieve a further higher torque lowering effect.

The rate of lowering in torque at 2000 rpm representing a highest rotation speed in the test was 9.5% in Example A and 11.5% in Example B, and an excellent torque lowering effect could be obtained even under a condition of use in rotation at a high speed in the differential gear or the transmission. Rates of lowering in torque at a rotation speed of 2000 rpm in Comparative Examples B and C were 8.0% and 6.5%, respectively.

Example 2

<Samples>

Four types of tapered rollers of samples Nos. 1 to 4 were prepared as samples. The model number of the tapered rollers was 30206. As a material for the tapered rollers, a JIS SUJ2 material (1.0 mass % of C-0.25 mass % of Si-0.4 mass % of Mn-1.5 mass % of Cr) was used.

Sample No. 1 was carbonitrided and quenched, and thereafter provided at opposing ends with a logarithmic crowning profile according to the present embodiment shown in FIG. 5. The sample was carbonitrided at 845° C. for 150 minutes. The sample was carbonitrided in an atmosphere of RX gas+ammonia gas. Sample No. 2 was carbonitrided and quenched similarly to sample No. 1, and thereafter provided with a partially arcuate crowning profile shown in FIG. 9.

Sample No. 3 was subjected to the heat treatment pattern shown in FIG. 21, and thereafter provided at opposing ends with a logarithmic crowning profile according to the present embodiment shown in FIG. 5. The sample was carbonitrided at 845° C. for 150 minutes. The sample was carbonitrided in an atmosphere of RX gas+ammonia gas. The sample was finally quenched at 800° C.

Sample No. 4 was subjected to the heat treatment pattern shown in FIG. 21, and thereafter provided at opposing ends with a logarithmic crowning profile according to the present embodiment shown in FIG. 5. In order to achieve a nitrogen concentration not lower than 0.1 mass % in the nitrogen enriched layer at a position of depth of 0.05 mm from the outermost surface of the sample, the sample was carbonitrided at 845° C. for 150 minutes. The sample was carbonitrided in an atmosphere of RX gas+ammonia gas. The atmosphere in the furnace was strictly controlled. Specifically, unevenness of the temperature in the furnace and unevenness of the ammonia gas atmosphere were suppressed. The sample was finally quenched at 800° C. Samples Nos. 3 and 4 described above correspond to Examples of the present invention. Samples Nos. 1 and 2 correspond to Comparative Examples.

<Contents of Experiments>
Experiment 1: Life Test

A life test apparatus was employed. As test conditions, test loads of Fr=18 kN and Fa=2 kN, lubricating oil of turbine oil 56, and a lubricating system of oil bath lubrication were applied. In the life test apparatus, two tapered roller bearings to be tested were arranged to support a support shaft at opposing ends. At a central portion of the support shaft in a direction of extension, that is, at a central portion between the two tapered roller bearings, a cylindrical roller bearing for applying a radial load to the tapered roller bearings via the support shaft was arranged. By applying a radial load to the load applying cylindrical roller bearing, the radial load was applied to the tapered roller bearings to be tested. An axial load was transmitted from one tapered roller bearing to the support shaft through a housing of the life test apparatus and applied to the other tapered roller bearing. Thus, the tapered roller bearing was subjected to the life test.

Experiment 2: Life Test with Unevenly Distributed Load Applied

The same test apparatus as in the life test in Experiment 1 was used. Although test conditions were basically the same as those in Experiment 1, an axial inclination of $2/1000$ rad with respect to a central axis of the roller was applied and the test was conducted with an unevenly distributed load being applied.

Experiment 3: Rotational Torque Test

Samples Nos. 1 to 4 were subjected to a torque measurement test by using a vertical torque test rig. As test conditions, a test load of Fa=7000 N, lubricating oil of turbine oil 56, a lubrication system of oil bath lubrication, and the number of rotations of 5000 rpm were applied.

<Result>
Experiment 1: Life Test

Sample No. 4 exhibited the best result and was considered to have a long life. While samples Nos. 2 and 3 were not comparable to Sample No. 4, they exhibited good results and were thus determined to be sufficiently durable for practical use. Sample No. 1 was shortest in life.

Experiment 2: Life Test with Unevenly Distributed Load Applied

Samples Nos. 4 and 3 exhibited the best result and were considered to have a long life. Sample No. 1 presented a relatively satisfactory result although it was not comparable to samples Nos. 4 and 3. Sample No. 2 presented a result worse than in Experiment 1, and is believed to have a short life due to the unevenly distributed load.

Experiment 3: Rotational Torque Test

Samples Nos. 1, 3, and 4 presented sufficiently small rotational torque and thus presented a good result. In contrast, sample No. 2 was larger in rotational torque than other samples.

From the above results, sample No. 4 generally presented a good result in any of the tests, and thus generally provided the best result. Sample No. 3 also presented a result better than that of samples Nos. 1 and 2.

Features described in each example included in the embodiments described above may be applied as being combined as appropriate within the technically consistent scope. For example, features in the second embodiment are applicable as being combined with features described in other embodiments so long as they are not technically inconsistent in particular.

It should be understood that the embodiments and Examples disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

10 tapered roller bearing; 11 outer ring; 11A, 13A raceway surface; 11B, 12B, 13B nitrogen enriched layer; 11C, 12C, 13C unnitrided portion; 12 roller; 12A rolling surface; 12E yet-to-be-worked surface; 13 inner ring; 14 cage; 16 larger end face; 16A projection; 16B recess; 16C circular arc; 16s spherical surface; 17 smaller end face; 18 larger flange surface; 18a conical surface; 18b flank; 18c chamfer; 19 smaller flange surface; 21, 25 chamfered portion; 22, 24 crowned portion; 22A crowning profile; 23 central portion; 26 centerline; 27 contact area crowned portion; 27A straight portion; 27B portion formed by logarithmic curve; 28 non-contact area crowned portion; 31 first measurement point; 32 second measurement point; 33 third measurement point; 41 larger flange; 42 smaller flange; 43 first grinding undercut; 44 second grinding undercut; 50 flange; 100 manual transmission; 106 smaller annular portion; 107 larger annular portion; 108 post; 109 pocket; 110a, 110b, 110c notch; 111 input shaft; 112 output shaft; 113 countershaft; 114a to 114k gear; 115 housing; 121 differential case; 122 drive pinion; 123 differential gear case; 124 ring gear; 125 pinion gear; 126 side gear; 190 undercut; 200 contact ellipse

The invention claimed is:

1. A tapered roller bearing comprising:
   an outer ring including an outer-ring raceway surface around an inner circumferential surface;
   an inner ring arranged on a radially inner side relative to the outer ring, the inner ring including an inner-ring raceway surface around an outer circumferential surface;

a plurality of tapered rollers disposed between the outer-ring raceway surface and the inner-ring raceway surface, the tapered roller including a rolling surface in contact with the outer-ring raceway surface and the inner-ring raceway surface; and a cage including a plurality of pockets arranged at prescribed intervals in a circumferential direction, the cage accommodating and holding the plurality of tapered rollers in the plurality of pockets, the cage including a smaller annular portion continuous on a smaller-diameter end face side of the tapered roller, a larger annular portion continuous on a larger-diameter end face side of the tapered roller, and a plurality of posts that couple the annular portions to each other, the pocket being provided in such a trapezoidal shape that a portion accommodating a smaller diameter side of the tapered roller is located on a smaller width side and a portion accommodating a larger diameter side is located on a larger width side, by providing a notch having a width in the post on the smaller width side of the pocket of the cage from a boundary between the smaller annular portion and the post toward the larger annular portion, lubricating oil that flows from an inner diameter side of the cage toward the inner ring being discharged from the notch toward the outer ring on an outer diameter side, and an edge of the smaller annular portion on a side of the pocket being in such a shape that a base portion on the smaller width side of the pocket extends to the post, a nitrogen enriched layer being formed on a surface layer of the outer-ring raceway surface of the outer ring, the inner-ring raceway surface of the inner ring, or the rolling surface of the tapered rollers, a distance from an outermost surface of the surface layer to a bottom of the nitrogen enriched layer being not shorter than 0.2 mm, the rolling surface of the tapered roller being provided with a crowning profile, and a sum of drops of the crowning profiles being expressed in a y-z coordinate system with a generatrix of the rolling surface of the tapered roller being defined as a y axis and a direction orthogonal to the generatrix being defined as a z axis, in an expression (1)

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

where $K_1$, $K_2$, and $z_m$ represent design parameters, Q represents a load, L represents a length in a direction of the generatrix, of an effective contact portion of the rolling surface in the tapered roller, E' represents an equivalent elastic modulus, a represents a length from an origin on the generatrix of the rolling surface of the tapered roller to an end of the effective contact portion, and A is defined as $A = 2K_1 Q/\pi L E'$.

2. The tapered roller bearing according to claim 1, wherein the inner ring includes a larger flange surface arranged on a larger diameter side relative to the inner-ring raceway surface, the plurality of tapered rollers each include a larger end face in contact with the larger flange surface, the inner ring has a smaller flange surface formed as a surface in parallel to a smaller end face of the tapered roller, a value of $R/R_{BASE}$ is not smaller than 0.75 and not greater than 0.87, with R representing a radius of curvature of the larger end face of the tapered roller and $R_{BASE}$ representing a distance from an apex of a cone angle of the tapered roller to the larger flange surface of the inner ring, and a roller coefficient y is greater than 0.90.

3. The tapered roller bearing according to claim 2, wherein a ratio $R_{process}/R$ between an actual radius of curvature $R_{process}$ and the radius of curvature R is not lower than 0.8 where $R_{process}$ represents an actual radius of curvature after grinding of the larger end face of the tapered roller.

4. The tapered roller bearing according to claim 3, wherein the larger end face has surface roughness Ra not greater than 0.10 [mi and the larger flange surface has surface roughness Ra not greater than 0.063 μm.

5. The tapered roller bearing according to claim 1, wherein a crowning profile formed portion where the crowning profile is formed in the rolling surface of the tapered roller includes a contact area crowned portion that is located within a range in an axial direction of the inner-ring raceway surface and is in contact with the inner-ring raceway surface and a non-contact area crowned portion that is located out of the range in the axial direction of the inner-ring raceway surface and is not in contact with the inner-ring raceway surface, in the contact area crowned portion and the non-contact area crowned portion, generatrices extending in the axial direction of the roller are lines expressed by functions different from each other and smoothly continuous to each other at a connection point, and in vicinity of the connection point, the generatrix of the non-contact area crowned portion is smaller in curvature than the generatrix of the contact area crowned portion.

6. The tapered roller bearing according to claim 5, wherein any one or both of a portion on a larger diameter side and a portion on a smaller diameter side of the generatrix of the non-contact area crowned portion is arcuate.

7. The tapered roller bearing according to claim 5 or 6, wherein any one or both of a portion on a larger diameter side and a portion on a smaller diameter side of the generatrix of the non-contact area crowned portion is straight.

8. The tapered roller bearing according to claim 5, wherein the generatrix of the contact area crowned portion is represented by a logarithmic crowning profile in part or in entirety.

9. The tapered roller bearing according to claim 1, wherein a grain size number of a prior austenite crystal grain size in the nitrogen enriched layer is equal to or greater than 10, and the grain size number and a method of measuring the prior austenite crystal grain are defined under JIS G0551: 2013.

10. The tapered roller bearing according to claim 1, wherein a nitrogen concentration in the nitrogen enriched layer is not lower than 0.1 mass % at a position of depth of 0.05 mm from the outermost surface.

11. The tapered roller bearing according to claim 1, wherein at least one of $K_1$, $K_2$, and $z_m$ in the expression (1) is optimized with a contact pressure being defined as an objective function.

12. The tapered roller bearing according to claim 1, wherein the smaller annular portion on the smaller width side of the pocket is also provided with a notch.

13. The tapered roller bearing according to claim 1, wherein at least the post on the larger width side of the pocket is also provided with a notch.

14. The tapered roller bearing according to claim 13, wherein a total area of notches provided on the smaller width side of the pocket is greater than a total area of notches provided on a larger width side of the pocket, and the lubricating oil that flows in is discharged through the notch on the smaller width side toward the outer ring on a larger diameter side in an amount greater than an amount through the notch on the larger width side.

15. The tapered roller bearing according to claim 1, wherein a radially inwardly extending flange opposed to an outer diameter surface of a smaller flange of the inner ring is provided on an axially outer side of the smaller annular portion of the cage, and a gap between an inner diameter surface of the flange of the smaller annular portion and the outer diameter surface of the smaller flange of the inner ring that are opposed to each other is equal to or smaller than 2.0% of an outer diameter dimension of the smaller flange of the inner ring.

\* \* \* \* \*